(12) United States Patent
Kelsey et al.

(10) Patent No.: US 10,614,106 B2
(45) Date of Patent: Apr. 7, 2020

(54) AUTOMATED TOOL FOR QUESTION GENERATION

(71) Applicant: Eduworks Corporation, Corvallis, OR (US)

(72) Inventors: Elaine Kelsey, Albany, OR (US); Robby Jozef Maria Goetschalckx, Corvallis, OR (US); Ronald Edward Ray, King City, OR (US); Aaron J. Veden, Vancouver, WA (US); Elliot Nicholas Robson, Corvallis, OR (US); Robert O. Robson, Corvallis, OR (US)

(73) Assignee: Eduworks Corporation, Corvallis, OR (US)

( * ) Notice: Subject to any disclaimer, the term of this patent is extended or adjusted under 35 U.S.C. 154(b) by 0 days.

(21) Appl. No.: 15/917,022

(22) Filed: Mar. 9, 2018

(65) Prior Publication Data
US 2018/0260472 A1    Sep. 13, 2018

Related U.S. Application Data

(60) Provisional application No. 62/469,807, filed on Mar. 10, 2017.

(51) Int. Cl.
*G06F 17/21*    (2006.01)
*G06F 16/332*    (2019.01)
(Continued)

(52) U.S. Cl.
CPC ...... *G06F 16/3329* (2019.01); *G06F 17/2264* (2013.01); *G06F 17/271* (2013.01); *G06F 17/2785* (2013.01); *G06F 17/2881* (2013.01)

(58) Field of Classification Search
CPC ... G09B 5/02; G09B 7/00; G09B 7/06; G09B 3/00; G09B 7/02; G06F 8/31;
(Continued)

(56) References Cited

U.S. PATENT DOCUMENTS 6,315,572 B1    11/2001    Owens et al.
7,430,505 B1 *    9/2008    Horvitz ............... G06F 17/279
                                                        704/9
(Continued)

OTHER PUBLICATIONS

Ha et al., "Automatic Distractor Suggestion for Multiple-Choice Tests Using Concept Embeddings and Information Retrieval," *Proceedings of the Thirteenth Workshop on Innovative Use of NLP for Building Educational Applications*, pp. 389-398, New Orleans, Louisiana, Jun. 5, 2018.
(Continued)

*Primary Examiner* — Gerald Gauthier
(74) *Attorney, Agent, or Firm* — Klarquist Sparkman, LLP

(57) ABSTRACT

Computerized methods are disclosed for automated question generation from source documents through natural language processing, for applications including training and testing. Interleaved selection and transformation phases employ combined semantic-syntactic analysis to progressively refine natural input text into a high density of text fragments having high content value. Non-local semantic content and attributes such as emphasis attributes can be attached to the text fragments. The text fragments are reverse parsed by matching against a precomputed library of combined semantic-syntactic patterns. Once the patterns of each fragment are determined, transformation of fragments into question-answer pairs is performed using question selectors and answer selectors tailored to each pattern. Methods for constructing distractors, both internal and external, are also disclosed. The ecosystem of machine learning components, ontology resources, and process improvement are also described.

20 Claims, 32 Drawing Sheets

(51) Int. Cl.
*G06F 17/27* (2006.01)
*G06F 17/28* (2006.01)
*G06F 17/22* (2006.01)

(58) Field of Classification Search
CPC .. G06F 16/3329; G06F 17/21; G06F 17/2264;
G06F 17/2271; G06F 17/274; G06F
17/2785; G06F 17/279; G06F 17/28;
G06F 17/2881; G06F 17/30654; G06F
17/30672; G06F 17/30867; G06F 9/44;
G06F 17/24; G06F 17/27; G06F 17/30;
G06N 5/02; G06N 5/04; G06N 99/005;
G10L 15/22; G10L 21/00
USPC .......... 434/167, 178, 322, 353; 704/2, 9, 10,
704/235, 277; 705/7.39; 706/13, 46, 54,
706/55; 707/723, 728, 740, 748, 749,
707/769; 709/206
See application file for complete search history.

(56) References Cited

U.S. PATENT DOCUMENTS

| | | | | |
|---|---|---|---|---|
| 8,311,808 | B2* | 11/2012 | Tinkler | G06F 17/2715 |
| | | | | 704/1 |
| 9,020,806 | B2* | 4/2015 | Zweig | G06F 17/27 |
| | | | | 434/156 |
| 9,330,084 | B1* | 5/2016 | Kadambi | G06F 17/2881 |
| 9,336,186 | B1* | 5/2016 | Filippova | G06F 17/2264 |
| 9,684,876 | B2* | 6/2017 | Agarwalla | G09B 7/06 |
| 9,792,908 | B1* | 10/2017 | Bassemir | G10L 25/51 |
| 9,812,028 | B1* | 11/2017 | Elchik | G06F 3/165 |
| 10,255,271 | B2* | 4/2019 | Alba | G06F 17/2785 |
| 2007/0136246 | A1* | 6/2007 | Stenchikova | G06F 17/279 |
| 2007/0192085 | A1* | 8/2007 | Roulland | G06F 16/3329 |
| | | | | 704/9 |
| 2009/0089126 | A1* | 4/2009 | Odubiyi | G06F 17/271 |
| | | | | 705/7.39 |
| 2009/0287678 | A1* | 11/2009 | Brown | G06F 17/28 |
| 2009/0326940 | A1* | 12/2009 | Markefka | G10L 15/26 |
| | | | | 704/235 |
| 2011/0066587 | A1* | 3/2011 | Ferrucci | G06N 5/04 |
| | | | | 706/54 |
| 2011/0123967 | A1* | 5/2011 | Perronnin | G09B 7/02 |
| | | | | 434/178 |
| 2011/0125734 | A1* | 5/2011 | Duboue | G09B 7/00 |
| | | | | 707/723 |
| 2011/0257961 | A1* | 10/2011 | Tinkler | G09B 7/06 |
| | | | | 704/9 |
| 2012/0183935 | A1* | 7/2012 | Hamada | G06F 17/2755 |
| | | | | 434/167 |
| 2013/0007055 | A1* | 1/2013 | Brown | F16H 1/28 |
| | | | | 707/769 |
| 2013/0066886 | A1* | 3/2013 | Bagchi | G06F 16/3329 |
| | | | | 707/749 |
| 2013/0149681 | A1* | 6/2013 | Tinkler | G09B 7/04 |
| | | | | 434/167 |
| 2013/0282704 | A1* | 10/2013 | Pantel | G06F 16/9535 |
| | | | | 707/723 |
| 2013/0304749 | A1* | 11/2013 | Cooper | G06F 16/9535 |
| | | | | 707/748 |
| 2014/0040181 | A1* | 2/2014 | Kuznetsov | G06F 17/2755 |
| | | | | 706/55 |
| 2014/0088952 | A1* | 3/2014 | Fife | G06F 17/27 |
| | | | | 704/9 |
| 2014/0136188 | A1* | 5/2014 | Wroczynski | G06F 17/2872 |
| | | | | 704/9 |
| 2014/0222743 | A1* | 8/2014 | Baughman | G06N 5/02 |
| | | | | 706/46 |
| 2014/0280087 | A1* | 9/2014 | Isensee | G06F 16/2455 |
| | | | | 707/723 |
| 2015/0057991 | A1* | 2/2015 | Mesheryakov | G06F 17/2785 |
| | | | | 704/2 |
| 2015/0088998 | A1* | 3/2015 | Isensee | H04L 51/02 |
| | | | | 709/206 |
| 2015/0170051 | A1* | 6/2015 | Bufe, III | G06N 3/126 |
| | | | | 706/13 |
| 2015/0193429 | A1* | 7/2015 | Bohra | G06F 16/3329 |
| | | | | 704/9 |
| 2015/0199400 | A1* | 7/2015 | Wu | G09B 7/02 |
| | | | | 434/353 |
| 2015/0331850 | A1* | 11/2015 | Ramish | G06F 17/2785 |
| | | | | 704/9 |
| 2016/0012058 | A1* | 1/2016 | Franceschini | G06F 16/338 |
| | | | | 707/728 |
| 2016/0026634 | A1* | 1/2016 | Allen | G06N 5/02 |
| | | | | 707/740 |
| 2016/0063879 | A1* | 3/2016 | Vanderwende | G06F 16/3329 |
| | | | | 434/322 |
| 2016/0117314 | A1* | 4/2016 | Kantor | G06F 17/2785 |
| | | | | 704/9 |
| 2016/0147739 | A1* | 5/2016 | Lim | G06F 17/27 |
| | | | | 704/9 |
| 2016/0275074 | A1* | 9/2016 | Bogdanov | G06F 17/2785 |
| 2016/0283581 | A1* | 9/2016 | Berajawala | G06F 16/3329 |
| 2017/0032689 | A1* | 2/2017 | Beason | G09B 7/00 |
| 2017/0169717 | A1* | 6/2017 | Allen | G09B 7/06 |
| 2017/0330079 | A1* | 11/2017 | Akolkar | G06F 16/3329 |
| 2017/0330087 | A1* | 11/2017 | Akolkar | G09B 7/06 |
| 2018/0060422 | A1* | 3/2018 | Wegryn | G06F 17/278 |
| 2018/0061256 | A1* | 3/2018 | Elchik | G06F 17/2229 |
| 2018/0075145 | A1* | 3/2018 | Zhao | G06F 17/248 |
| 2018/0107457 | A1* | 4/2018 | Barad | G06F 8/70 |
| 2018/0107647 | A1* | 4/2018 | Ackermann | G06F 17/278 |
| 2018/0107648 | A1* | 4/2018 | Ackermann | G06F 17/278 |
| 2018/0260472 | A1* | 9/2018 | Kelsey | G06F 17/271 |
| 2018/0300311 | A1* | 10/2018 | Krishnamurthy | G06F 17/274 |
| 2019/0304320 | A1* | 10/2019 | Apokatanidis | G06F 17/2881 |

OTHER PUBLICATIONS

Lindberg et al., "Generating Natural Language Questions to Support Learning On-Line," *Proceedings of the 14th European Workshop on Natural Language Generation*, pp. 105-114, Sofia, Bulgaria, Aug. 8-9, 2013.

International Search Report issued in International Application No. PCT/US2018/021798 dated Jun. 28, 2018, 3 pages.

Written Opinion of the International Searching Authority issued in International Application No. PCT/US2018/021798 dated Jun. 28, 2018, 10 pages.

Agarwal et al., "Automatic gap-fill question generation from text books," *Proceedings of the 6th Workshop on Innovative Use of NLP for Building Educational Applications*, Association for Computational Linguistics, pp. 56-64 (Jun. 24, 2011).

Araki et al., "Generating Questions and Multiple-Choice Answers using Semantic Analysis of Texts," *Proceedings of COLING 2016, the 26th International Conference on Computational Linguistics: Technical Papers*, pp. 1125-1136 (Dec. 11-17, 2016).

Boyer et al., "Proceedings of QG2010: The Third Workshop on Question Generation," downloaded from https://www.researchgate.net/publication/45194741_Proceedings_of_QG2010_The_Third_Workshop_on_Question_Generation, pp. 1-91 (Jun. 18, 2010).

Enzinger, "LEVR RS2 Tutorial," *Eduworks Open Source Libraries*, downloaded from http://ew.eduworks.org/index.html?doc=1JJ2aZ8UNSq6-ZP0XnYQxerNf02bUaAB3WwZ4De3is8k, 7 pages (document not dated, downloaded on or before Feb. 23, 2018).

Heilman et al., "Good Question! Statistical Ranking for Question Generation," *Carnegie Mellon University, Language Technology Institute*, 10 pages (also published as Heilman et al., "Good Question! Statistical Ranking for Question Generation," *Proceedings of the Conference of the North American Chapter of the Association for Computational Linguistics: Human Language Technologies*, pp. 609-617 (Jun. 2010)).

Heilman et al., "Question Generation via Overgenerating Transformations and Ranking," *Carnegie Mellon University, Language Technologies Institute*, CMU-LTI-09-013, 16 pages (2009).

(56) References Cited

OTHER PUBLICATIONS

Heilman et al., "Rating computer-generated questions with Mechanical Turk," *Carnegie Mellon University, Language Technology Institute*, 7 pages (also published as Heilman et al., "Rating computer-generated questions with Mechanical Turk," *Proceedings of the NAACL HLT Workshop on Creating Speech and Language Data with Amazon's Mechanical Turk*, Association for Computational Linguistics, pp. 35-40 (2010)).

Lee et al., "Stanford's Multi-Pass Sieve Conference Resolution System at the CoNLL-2011 Shared Task," In *Proceedings of the 15th Conference on Computational Natural Language Learning: Shared Task*, Association for Computational Linguistics, pp. 28-34 (Jun. 23-24, 2011).

Mannem et al., "Question generation from paragraphs at UPenn: QGSTEC system description," *Proceedings of QG2010: The Third Workshop on Question Generation*, pp. 84-91 (Jun. 2010).

Mikolov et al., "Distributed Representations of Words and Phrases and Their Compositionality," pp. 1-9 (also published as "Distributed Representations of Words and Phrases and Their Compositionality," *Advances in Neural Information Processing Systems*, pp. 3111-3119 (2013)).

Mikolov et al., "Efficient Estimation of Word Representations in Vector Space," ArXiv 1301.3781, <http://arxiv.org/abs/1301.3781>, pp. 1-12 (Sep. 7, 2013).

Mnih et al., "Learning Word Embeddings Efficiently with Noise-Contrastive Estimation," pp. 1-9 (also published as Mnih et al., "Learning Word Embeddings Efficiently with Noise-Contrastive Estimation," *Advances in Neural Information Processing Systems*, pp. 2265-2273 (2013)).

Rus et al., "Question Generation Shared Task and Evaluation Challenge—Status Report," *Proceedings of the 13th European Workshop on Natural Language Generation (ENLG)*, Association for Computational Linguistics, pp. 318-320 (Sep. 2011).

Serban et al., "Generating Factoid Questions With Recurrent Neural Networks: The 30M Factoid Question-Answer Corpus," ArXiv 1603.06807 <http://arxiv.org/abs/1603.06807>, 13 pages (May 29, 2016).

Swayamdipta et al., "Greedy, Joint Syntactic-Semantic Parsing with Stack LSTMs," ArXiv 1606.08954 <http://arxiv.org/abs/1606.08954>, pp. 1-13 (Jun. 29, 2016).

Xie et al., "Learning Greedy Policies for the Easy-First Framework," *Proceedings of the 29th AAAI Conference on Artificial Intelligence*, pp. 2339-2345 (2015).

Yao et al., "Semantics-based Question Generation and Implementation," *Dialogue & Discourse*, vol. 3, No. 2, pp. 11-42 (Mar. 12, 2012).

* cited by examiner

A Condensed Example of How Interweaving of Multiple Layers of
Selection and Transformation Can be Used to Produce Questions
from an Input Document

| Input Document |
|---|
| This chapter covers basic information about the heart. The heart is a muscular organ which pumps blood through the blood vessels of the circulatory system. It beats at a resting rate of close to 72 beats per minute. In humans, other mammals, and birds, the heart is divided into four chambers. These chambers are: upper left and right atria; and lower left and right ventricles. Heart failure, often referred to as congestive heart failure, occurs when the heart is unable to pump sufficiently to maintain blood flow to meet the body's needs. Diagnosis of heart disease is often done by taking a medical history. |

*FIG. 3A*

| Select |
|---|
| The heart is a muscular organ which pumps blood through the blood vessels of the circulatory system. It beats at a resting rate of close to 72 beats per minute. In humans, other mammals, and birds, the heart is divided into four chambers. These chambers are: upper left and right atria; and lower left and right ventricles. Heart failure, often referred to as congestive heart failure, occurs when the heart is unable to pump sufficiently to maintain blood flow to meet the body's needs. Diagnosis of heart disease is often done by taking a medical history. |

*FIG. 3B*

| Transform |
|---|
| The heart is a muscular organ which pumps blood through the blood vessels of the circulatory system. The heart beats at a resting rate of close to 72 beats per minute. In humans, other mammals, and birds, the heart is divided into 4 chambers. These chambers are: upper left and right atria; and lower left and right ventricles. Heart failure, often referred to as congestive heart failure, occurs when the heart is unable to pump sufficiently to maintain blood flow to meet the body's needs. Diagnosis of heart disease is often done by taking a medical history. |

*FIG. 3C*

Select
The heart is a muscular organ which pumps blood through the blood vessels of the circulatory system.

The heart beats at a resting rate of close to 72 beats per minute.

In humans, other mammals, and birds, the heart is divided into 4 chambers.

These chambers are: upper left and right atria; and lower left and right ventricles.

Heart failure, often referred to as congestive heart failure, occurs when the heart is unable to pump sufficiently to maintain blood flow to meet the body's needs.

Diagnosis of heart disease is often done by taking a medical history.

*FIG. 3D*

Transform
The heart is a muscular organ.

The heart is a muscular organ which pumps blood through the blood vessels of the circulatory system.

The heart beats at a resting rate of about 72 beats per minute.

In humans, other mammals, and birds, the heart is divided into 4 chambers.

In humans, the heart is divided into 4 chambers.

In mammals, the heart is divided into 4 chambers.

In birds, the heart is divided into 4 chambers.

The chambers of the heart are: upper left atrium, upper right atrium, lower left ventricle, and lower right ventricle.

Heart failure is often referred to as congestive heart failure.

Heart failure occurs when the heart is unable to pump sufficiently to maintain blood flow to meet the body's needs.

Diagnosis of heart disease is often done by taking a medical history.

*FIG. 3E*

> Select
> The heart is a muscular organ which pumps blood through the blood vessels of the circulatory system.
>
> The heart beats at a resting rate of about 72 beats per minute.
>
> In humans, the heart is divided into 4 chambers.
>
> Heart failure occurs when the heart is unable to pump sufficiently to maintain blood flow to meet the body's needs.
>
> Diagnosis of heart disease is often done by taking a medical history.

*FIG. 3F*

> Transform
> Question: How is diagnosis of heart disease done?
>
> Correct Answer:        by taking a medical history
>
> Incorrect Answers:     by taking an x-ray
>                            by taking notes
>                            by connecting the patient to a CPB pump

*FIG. 3G*

> Question: "A muscular organ which pumps blood through the blood vessels of the circulatory system" best describes which of the following?
>
> Correct Answer: the heart
>
> Incorrect Answers:     the lungs
>                            the brain
>                            the circulatory system

*FIG. 3H*

> Question: In humans, how many chambers is the heart divided into?
>
> Correct Answer: 4
>
> Incorrect Answers:     2, 3, 5

*FIG. 3I*

Question: What happens when the heart is unable to pump sufficiently to maintain blood flow to meet the body's needs?

Correct Answer: heart failure occurs
Incorrect Answers:    blood pressure increases
            blood pressure decreases
            blood flow to the brain increases

FIG. 3J

Question: The heart beats at a resting rate of about ____ beats per minute.

Correct Answer:    72

Incorrect Answers:    52, 62, 75

FIG. 3K

Pattern Type: ListfullyComplete

```
listfullySelector = #cache(
    obj = #sSelect(pos="NP")
      .sNext(word=":")
        .sAny(selector=#sNext(word="as"))
          .sNext(pos="NP").sNext(pos=",")
            .sAny(selector=#sNext(pos="NP")
              .sNext(pos=","))
                .sAny(selector=#sNext(pos="NP"))
                  .sAny(selector=#sNext(word="and or"))
                    .sAny(selector=#sNext(pos="NP")),
    name = "listfullySelector"
);
```

*FIG. 4A*

```
selector1 = preselected.forEach(
    paramName = "theObject",
    op = #sGet(
        obj = #string(str="@theObject")
          .toObject().get(sentence="")
            .toString(),
        Selector = listfullySelector,
        Treebank = "true"
    ).count()
);
```

*FIG. 4B*

```
keepThese1 = selector1.forEach(
    paramName = "qobj",
    array = "true",
    valueName = "positives",
    op = #if(
        operator="@positives",
        operand="0",
        gt=#string(str="@qobj")
    )
);
```

*FIG. 4C*

```
selector2 = keepThese1.forEach(
    paramName="theObject",
    op=#if(
        operator=#string(str="@theObject")
          .toObject()
            .get(sentence="")
            .split(split=" ")
              .has(has="following"),
        operand="true",
        eq="0",
        ne="1"
    )
);
```

*FIG. 4D*

```
keepThese2 = selector2.forEach(
    paramName="qobj",
    array="true",
    valueName="positives",
    op=#if(
        operator="@positives",
        operand="0",
        gt=#string(str="@qobj")
    )
);
```

*FIG. 4E*

```
selector3 = keepThese2.forEach(
    paramName="theObject",
    op=#if(
        operator=#string(str="@theObject")
          .toObject()
            .get(sentence="")
            .indexOf(substr="two types:"),
        operand=#string(str="-1").toInteger(),
        eq="1",
        ne="0"
    )
);
```

*FIG. 4F*

```
keepThese3 = selector3.forEach(
    paramName="qobj",
    array="true",
    valueName="positives",
    op=#if(
        operator="@positives",
        operand="0",
        gt=#string(str="@qobj")
    )
);
```

FIG. 4G

```
selector4 = keepThese3.forEach(paramName="theObject",
    op=#if(
        operator=#string(str="@theObject")
         .toObject()
          .get(sentence="")
           .indexOf(substr="including:"),
        operand=#string(str="-1")
         .toInteger(),
        eq="1",
        ne="0"
    )
);
```

FIG. 4H

```
keepThese4 = selector4.forEach(
    paramName="qobj",
    array="true",
    valueName="positives",
    op=#if(
        operator="@positives",
        operand="0",
        gt=#string(str="@qobj")
    )
);
```

FIG. 4I

```
selector5 = keepThese4.forEach(
    paramName="theObject",
    op=#if(
        operator=#string(str="@theObject")
         .toObject().get(sentence="")
          .indexOf(substr=", if needed, "),
        operand=#string(str="-1").toInteger(),
        eq="1",
        ne="0"
    )
);
```

FIG. 4J

```
keepThese5 = selector5.forEach(
    paramName="qobj",
    array="true",
    valueName="positives",
    op=#if(
        operator="@positives",
        operand="0",
        gt=#string(str="@qobj")
    )
);
```

FIG. 4K

```
selector6 = keepThese5.forEach(
    paramName="theObject",
    op=#if(
        operator=#string(str="@theObject")
         .toObject()
          .get(sentence="")
           .indexOf(substr="existing circumstances: "),
        operand=#string(str="-1")
         .toInteger(),
        eq="1",
        ne="0"
    )
);
```

FIG. 4L

```
keepThese6 = selector6.forEach(
    paramName="qobj",
    array="true",
    valueName="positives",
    op=#if(
        operator="@positives",
        operand="0",
        gt=#string(str="@qobj")
    )
);
```

*FIG. 4M*

```
selector7 = keepThese6.forEach(
    paramName="theObject",
    op=#if(
        operator=#string(str="@theObject")
          .toObject()
            .get(sentence="")
            .indexOf(substr="two sections: "),
        operand=#string(str="-1")
          .toInteger(),
        eq="1",
        ne="0"
    )
);
```

*FIG. 4N*

Pattern Type: CoreAction

```
removalSelector=#sSelect(
    word="This When These If is was are were will not has have
    do does apply applies exist exists feature features
    perceive perceives contain involve involves include
    indicate indicates contains consist consists cover covers
    identically includes become becomes range ranges remains
    remain span spans appear appears spend spends refer refers
    take takes show shows represent represents require
    requires face faces look looks occur occurs utilize
    utilizes vary varies this these : when ?"
);

removalSelector2=#sSelect(
    word="change changes continue continues rely relies result
    results comes come depend depends sustain sustains begin
    begins"
).sNext(word="over to on from damage at");

removalSelector4=#sSelect(pos="S")
 .sNext(pos=",")
   .sNext(pos="CC")
     .sNext(pos="S");

removalSelector5=#sSelect(pos="S")
 .sNext(pos=",")
   .sNext(pos="S");

nextSelector=#sSelect(pos="NN NNS NNP NNPS")
 .sNext(pos="VBP VBZ")
   .sNext(pos="CC CD DT EX FW IN JJ JJR JJS LS MD NN NNS NNP
      NNPS PDT POS PRP PP$ RB RBR RBS RP SYM TO UH VB VBD VBG
      VBN VBP VBZ WDT WP WP$ WRB");

questionSelector=#sSelect(pos="VBP VBZ");

nounSelector=#sSelect(pos="NNS NNPS");
```

*FIG. 5A*

```
//remove subordinate clauses before finding the core verb
cleaningSelector1=#sSelect(word="Finally However Thus Also")
  .sNext(pos=",");

cleaningSelector1a=#sSelect(word="Finally However Thus Also");

cleaningSelector2=#sSelect(word="For In")
  .sNext(word="example addition fact")
   .sNext(pos=",");

cleaningSelector2a=#sSelect(word="For In")
  .sNext(word="example addition fact");

cleaningSelector3=#sSelect(word="In")
  .sNext(word="both")
    .sNext(word="cases")
     .sNext(pos=",");

cleaningSelector3a=#sSelect(word="In")
  .sNext(word="both")
    .sNext(word="cases");

cleaningSelector4=#sSelect(word="As")
  .sNext(word="one")
    .sNext(word="can")
     .sNext(word="see")
      .sNext(pos=",");

cleaningSelector4a=#sSelect(word="As")
  .sNext(word="one")
    .sNext(word="can")
     .sNext(word="see");
```

*FIG. 5B*

```
coreSentenceClean1=#if(
    operator=#string(str="@sentence")
     .sHas(selector=cleaningSelector1,treebank="true"),
    operand="true",
    eq=#string(str="@sentence")
     .split(
        split=#string(str="@sentence")
         .sGet(selector=cleaningSelector1a)
```

*FIG. 5C*

```
                .getIndex(index="0")
    ).getIndex(index="1")
        .flatten(_delimiter=" "),
    ne=#if(
        operator=#string(str="@sentence")
          .sHas(selector=cleaningSelector2,treebank="true"),
        operand="true",
        eq=#string(str="@sentence")
          .split(
              split=#string(str="@sentence")
                .sGet(selector=cleaningSelector2a)
                .getIndex(index="0")
          ).getIndex(index="1")
            .flatten(_delimiter=" "),
        ne=#if(
            operator=#string(str="@sentence")
              .sHas(selector=cleaningSelector3,
                treebank="true"),
            operand="true",
            eq=#string(str="@sentence")
              .split(
                  split=#string(str="@sentence")
                    .sGet(selector=cleaningSelector3a)
                    .getIndex(index="0")
              ).getIndex(index="1")
                .flatten(_delimiter=" "),
            ne=#if(
                operator=#string(str="@sentence")
                  .sHas(selector=cleaningSelector4,
                    treebank="true"),
                operand="true",
                eq=#string(str="@sentence")
                  .split(
                      split=#string(str="@sentence")
                        .sGet(selector=cleaningSelector4a)
                        .getIndex(index="0")
                  ).getIndex(index="1")
                    .flatten(_delimiter=" "),
                ne=#string(str="@sentence")
            )
        )
    )
);
```

FIG. 5D

```
coreSentenceClean=#if(
    operator=#startswith(string1=coreSentenceClean1,string2=",
"),
    operand="true",
    eq=#string(
        str=coreSentenceClean1
          .split(split=" ")
            .removeFromArray(_index="0")
              .flatten(_delimiter=" "),
        op="trim"),
    ne=coreSentenceClean1
).capitalizeFirstWord();
```

*FIG. 5E*

```
clauseSelector=#sSelect(
    word="While As To When After Before If For Once Since
      Although")
        .sAny(selector=#sNext(pos="CC CD DT EX FW IN JJ JJR JJS
          LS MD NN NNS NNP NNPS PDT POS PRP PP$ RB RBR RBS RP SYM
          TO UH VB VBD VBG VBN VBP VBZ WDT WP WP$ WRB")
).sNext(pos=",");
```

*FIG. 5F*

```
coreSentence = #if(
    operator=coreSentenceClean
      .sHas(selector=clauseSelector,treebank="true"),
    operand="true",
    eq=#removeAllPhrasesFromText(
        obj=coreSentenceClean,
        removePhrases=#string(str="@sentence")
          .sGet(selector=clauseSelector,treebank="true")
            .getIndex(index="0")
              .split(split=" ")
                .removeFromArray(item=",")
                  .flatten(_delimiter=" ")
                    .toArray(),
        caseSensitive="true"
    ).capitalizeFirstWord(),
    ne=coreSentenceClean
);
```

*FIG. 5G*

```
removeThem = sentencesFiltered.forEach(
    paramName="sentence",
    threaded="false",
    op=#sGet(
        obj=#string(str="@sentence"),
        selector=removalSelector,
        treebank="true"
    ).count()
);
```

*FIG. 5H*

```
keepThese=removeThem.forEach(
    paramName="sentence",
    array="true",
    threaded="false",
    valueName="positives",
    op=#if(
        operator="@positives",
        operand="0",
        eq=#object(a=#string(str="@sentence"))
          .getByParam(param="a")
    )
);
```

*FIG. 5I*

```
removeThem2 = keepThese.forEach(
    paramName="sentence",
    threaded="false",
    op=#sGet(
        obj=#string(str="@sentence"),
        selector=removalSelector2,
        treebank="true"
    ).count()
);
```

*FIG. 5J*

```
keepThese2=removeThem2.forEach(
    paramName="sentence",
    threaded="false",
    array="true",
    valueName="positives",
    op=#if(
        operator="@positives",
        operand="0",
        eq=#object(a=#string(str="@sentence"))
          .getByParam(param="a")
    )
);
```

*FIG. 5K*

```
removeThem3=keepThese2.forEach(
    paramName="sentence",
    threaded="false",
    op=#if(
        operator=#string(str="@sentence")
          .startsWith(string2="One"),
        operand="true",
        ne="0",
        eq=#if(
            operator=#string(str="@sentence")
              .indexOf(substr="the other"),
            operand="-1",
            eq="0",
            ne="1"
        )
    )
);
```

*FIG. 5L*

```
keepThese3=removeThem3.forEach(
    paramName="sentence",
    array="true",
    threaded="false",
    valueName="positives",
    op=#if(
        operator="@positives",
        operand="0",
        eq=#object(a=#string(str="@sentence"))
          .getByParam(param="a")
    )
);
```

*FIG. 5M*

```
removeThem4=keepThese3.forEach(
    paramName="sentence",
    threaded="false",
    op=#sGet(
        obj=#string(str="@sentence"),
        selector=removalSelector4,
        treebank="true"
    ).count()
);
```

*FIG. 5N*

```
keepThese4=removeThem4.forEach(
    paramName="sentence",
    array="true",
    threaded="false",
    valueName="positives",
    op=#if(
        operator="@positives",
        operand="0",
        eq=#object(a=#string(str="@sentence"))
          .getByParam(param="a")
    )
);
```

*FIG. 5O*

```
removeThem5=keepThese4.forEach(
    paramName="sentence",
    threaded="false",
    op=#sGet(
        obj=#string(str="@sentence"),
        selector=removalSelector5,
        treebank="true"
    ).count()
);
```

*FIG. 5P*

```
keepThese5=removeThem5.forEach(
    paramName="sentence",
    array="true",
    threaded="false",
    valueName="positives",
    op=#if(
        operator="@positives",
        operand="0",
        eq=#object(a=#string(str="@sentence"))
          .getByParam(param="a")
    )
);
```

*FIG. 5Q*

```
selected = #cache(
    obj=keepThese5.forEach(
        paramName="sentence",
        threaded="false",
        op=#sGet(
            obj=#string(str="@sentence"),
            selector=nextSelector,
            treebank="true"
        ).count()
    ),
    name="selected"
);
```

*FIG. 5R*

**Example: Question Generators for the Pattern-Type
"ByGerundsBeard"**

```
sentence=#toObject(obj="@qobj")
 .get(sentence="");

clauseSelector=#sSelect(
     word="While As To When After Before If For Once Since
     Although"
).sAny(
     selector=#sNext(
          pos="CC CD DT EX FW IN JJ JJR JJS LS MD NN NNS NNP
          NNPS PDT POS PRP PP$ RB RBR RBS RP SYM TO UH VB VBD
          VBG VBN VBP VBZ WDT WP WP$ WRB"
     )
).sNext(pos=",");
```

*FIG. 6A*

```
sentence2=#if(
     operator=sentence.split(split=", such as by")
      .count(),
     operand="2",
     ne=sentence,
     eq=#add(
          a=sentence
           .split(split=", such as by")
             .getIndex(index="0"),
          b=" by",
          c=sentence
           .split(split=", such as by")
             .getIndex(index="1")
     )
);
```

*FIG. 6B*

```
sentence=#if(
    operator=sentence2
      .sHas(selector=clauseSelector,treebank="true"),
    operand="true",
    eq=#removeAllPhrasesFromText(
        obj=sentence,
        removePhrases=sentence2
          .sGet(selector=clauseSelector,treebank="true")
            .getIndex(index="0")
              .split(split=" ")
                .removeFromArray(item=",")
                  .flatten(_delimiter=" ")
                    .toArray(),
        caseSensitive="true"
    ).capitalizeFirstWord(),
    ne=sentence2
);
```

*FIG. 6C*

```
prepositionlessSentence=#removePrepositionalPhrasesAfter(
    obj=sentence,
    after="by"
).removeAdverbPhrases()
  .string(op="trim",chars=", ");

prepositionlessSentenceVP=#removePrepositionalPhrasesAfter(
    obj=sentence,
    after="by"
).removeAdverbPhrases()
  .string(op="trim",chars=", ");

prepositionlessSentenceTrimmedNP=prepositionlessSentence
  .firstNounPhrase();
prepositionlessSentenceTrimmedVP=prepositionlessSentenceVP
  .removeSubordinateConjunctions()
    .firstVerbPhraseNotInNounPhrase()
      .string(op="trim",chars=", ");

prepositionlessSentenceTrimmedVPSplit=
 prepositionlessSentenceTrimmedVP.split(split=" ");
```

*FIG. 6D*

```
prepositionlessSentenceTrimmedVPFirst=prepositionlessSentenceTr
immedVPSplit
  .getIndex(index="0")
   .lowerFirstWord()
     .string(op="trim",chars=", ");
```

*FIG. 6E*

```
okVerbs=#object(
     a="is",
     b="has",
     c="can",
     d="should",
     e="does",
     f="may",
     g="shall",
     h="are",
     i="must"
).valueSet();
```

*FIG. 6F*

```
prepositionlessSentenceTrimmedQ=#object(
     a="How ",
     b=prepositionlessSentenceTrimmedVPFirst,
     c=" ",
     d=prepositionlessSentenceTrimmedNP
       .lowerFirstWord(),
     e=" ",
     f=prepositionlessSentenceTrimmedVPSplit
       .remove(_index="0")
        .flatten(_delimiter=" ")
         .string(op="trim")
).flatten()
  .replace(simple="true",replace=".",with="")
   .string(op="trim")
    .add(z="?");
```

*FIG. 6G*

```
question=prepositionlessSentenceTrimmedQ
 .fixPunctuationSpaces();
```

*FIG. 6H*

```
answerKeywords=#cremoveAllFromText(
    obj=sentence,
    removeWords=#stopWordList(),
    caseSensitive="false"
);

answerKeywordNouns=#csGet(
    obj=answerKeywords,
    selector=#csSelect(pos="NN NNS NNP NNPS",word="")
).removeDuplicates();
```

*FIG. 6I*

```
filterTags=#object(
    SISVP=#if(
        operator=sentence.firstVerbPhrase(),
        operand=sentence.wholePhrase(),
        eq="SISVP"
    ),
    SBAR=#if(
        operator=sentence.firstSubordinatePhrase(),
        operand=sentence.wholePhrase(),
        eq="SBAR"
    ),
    FirstNPisPhrase=#if(
        operator=prepositionlessSentenceTrimmedNP,
        operand=prepositionlessSentenceTrimmed,
        eq="FirstNPisPhrase"
    ),
    NOAUXILLARYVERB=#if(
        operator=okVerbs
          .has(has=prepositionlessSentenceTrimmedVPFirst),
        operand="false",
        eq="NOAUXILLARYVERB"
    )
).valueSet();
```

*FIG. 6J*

```
gerundFilter=keepThese1.forEach(
    paramName="qobj",
    op=filterTags
);
```

*FIG. 6K*

```
gerundFilterIf=gerundFilter.forEach(
    paramName="qobj",
    valueName="reasons",
    op=#if(
        operator=#toArray(obj="@reasons").count(),
        operand="0",
        eq="@qobj"
    )
).valueSet();
```

*FIG. 6L*

```
answerSet = #cache(
    obj=gerundFilterIf.forEach(
        paramName="theObject",
        array="true",
        op = #object(
            distractorKeywordsLevel2 = #csGet(
                obj=#string(str="@theObject")
                  .toObject()
                    .get(paragraph=""),
                selector=#csSelect(
                    pos="NN NNS NNP NNPS",word=""
                )
            ).removeDuplicates(),
            distractorKeywordsLevel1 = #csGet(
                obj=#string(str="@theObject")
                  .toObject()
                    .get(sentence=""),
                selector=#csSelect(
                    pos="NN NNS NNP NNPS",word=""
                )
            ).removeDuplicates(),
            answer = #sGet(
                obj=#toObject(obj="@theObject")
                  .get(sentence=""),
                treebank="true",
                selector=#sSelect(pos="PP")
            ).forEach(
                paramName="sentence",
                array="true",
                op=#if(
                    operator=#has(
                        obj=#toLower(obj="@sentence"),
                        has="by"
                    ),
                    operand="true",
                    eq="@sentence"
                )
            ).selectShortest()
              .lowerFirstWord()
                .fixPunctuationSpaces()
        )
    ),
    name="answerSet"
);
```

*FIG. 6M*

AUTOMATED TOOL FOR QUESTION GENERATION

CROSS REFERENCE TO RELATED APPLICATION

This application claims the benefit of U.S. Provisional Application No. 62/469,807, entitled AUTOMATED TOOL FOR QUESTION GENERATION, filed Mar. 10, 2017, which is incorporated by reference herein in its entirety.

FIELD

This application pertains to the field of natural language processing.

BACKGROUND

Natural language processing (NLP) has made great strides in recent years in areas such as machine translation, speech processing, and search. "Question generation" refers to the act of automatically generating questions from source text documents, and is used for purposes such as training and educational testing. Question generation also encompasses the generation of answers. Though it can be applied in a wide variety of settings, the field of question generation has received relatively little attention. Present techniques for automated question generation have a number of limitations. For example, the generated questions may be limited to simple forms (e.g. similar to fill-in-the-blank), may not have a unique correct answer, or may not be well crafted (e.g. a person may readily distinguish that a particular question would not have been created by a person conversant with the language and subject matter). Often, alternatives to the correct answer are needed (e.g. in a multiple choice test or a true-false test); such alternatives are termed "distractors". However, these "distractors" either may not be generated or may be of poor quality. Moreover, a set of generated questions may not provide good coverage of the source material when viewed collectively. Accordingly, there remains a need for improved natural language techniques for question generation and related problems.

SUMMARY

In summary, the detailed description is directed to various innovative technologies for natural language processing as applied to the field of question generation. Some examples of disclosed technologies use a combination of selection and transformation operations to progressively refine received source text, generate questions, and generate answers. Some examples of disclosed technologies use reverse parsing, wherein text is matched against a library of combined semantic-syntactic patterns.

According to one aspect of the disclosed technology, questions are generated from a source document by computer. Passages of text are selected from the source document according to a criterion. The selected text passages are transformed based at least partly on coreference analysis. Fragments of text from the transformed passages are selected based on matching combined semantic-syntactic patterns from a pattern library. The selected text fragments are automatically transformed by computer to generate questions.

In some examples, the source document can be a machine-readable facsimile of human-readable text organized in sentences and paragraphs. The criterion for a given passage to be selected can be that the given passage has a similarity at least equal to a content relevancy threshold, relative to at least one subject matter descriptor of the source document. The transforming of text passages can include replacement of selected coreferences based on their likelihoods of correct resolution as determined by the coreference analysis. This transformation can include identifying coreferences in the text passage including one or more of anaphora, cataphora, endophora, or exaphora. The identified coreferences can be classified according to a plurality of coreference types having varying levels of difficulty for correct resolution. Initially, coreferences of a first type can be selected, the first type being the easiest to resolve. The text passage can be analyzed, optionally in conjunction with other ontological resources, to determine most probable resolutions of the initially selected coreferences, which can then be replaced according to their probability of correct resolution. Subsequently, the text passage can be regenerated with one or more of the initially selected coreferences resolved and replaced. A new selection of coreferences of a second type can be made, wherein the second type is the next most easily resolved type of coreference after the first type. The text passage can be analyzed to determine most probably resolutions of the newly selected coreferences, which can then be resolved and replaced, dependent on their probabilities of correct resolution. The sequence of coreference analysis, selection of coreferences, and replacement of selected coreferences can be repeated, either a predetermined number of times, or until a threshold condition is reached. A single text fragment can correspond to less than an entire sentence of the source document, or a single sentence, or multiple sentences. A combined semantic-syntactic pattern can include a plurality of nodes representing respective syntactic parts of a text fragment. At least one node can have an associated semantic attribute, and at least one pair of nodes can be coupled by a relationship attribute. A degree of a combined semantic-syntactic pattern can be defined as a number counting at least all nodes, all semantic attributes, and all relationship attributes of the combined semantic-syntactic pattern. The matching between a given text fragment and a given pattern can include comparing the nodes, their corresponding semantic attributes, and the relationship attributes, to determine a matching score. If the matching score is at least equal to a matching threshold, then the given text fragment can be selected. A combined semantic-syntactic pattern can include an emphasis attribute or non-local semantic content. Combined semantic-syntactic patterns or selectors can be chosen from a library based on classifications of desired questions. The classifications can be based on Bloom's taxonomy or a similar educational taxonomy.

In further examples, the transformation of a given text fragment into one or more questions can be dependent on which pattern of the pattern library matches the given text fragment. An answer selector can be selected from an answer selector library based on the matching pattern and applied to the given text fragment to determine a correct answer for a question based on the given text fragment. The correct answer can also be transformed into an internal distractor by applying negation to the correct answer, by applying shifting to the correct answer, or by applying a pattern substitution to the correct answer. Alternatively or additionally, text can be identified in the source document or in an external corpus, the identified text having non-synonymous similarity with the correct answer (or with the given text fragment). The identified text can be transformed into a distractor. Similarity can be determined from vector representations of text, such as by using Word2Vec or a similar tool.

According to another aspect, questions are generated from a source document. The source document is received at a computer. Text of the source document is progressively refined over a succession of phases including a first selection phase, a first transformation phase, a second selection phase, and a second transformation phase. One phase operates on the source document, and the other phases operate on an output of a preceding phase.

In some examples, the first selection phase can include determining respective content values for portions of the source document, and selecting, based on the content values, a portion of the source document to be output or stored. The first transformation phase can include resolution of coreferences, such as anaphora, cataphora, proforms, endophora, or exaphora. The second selection phase can include reverse parsing; an input to the second selection phase can be matched against a library of combined semantic-syntactic patterns. Inputs to the second transformation phase, such as statements or sentence fragments, can be transformed into questions during the second transformation phase. The first selection phase, the first transformation phase, the second selection phase, and the second transformation phase can be performed in that order. One or more additional pairs of phases, each pair including a selection phase and a transformation phase, can be included in the refinement procedure.

In a third aspect, the disclosed technology provides a computer-implemented method of generating one or more questions. One or more source documents are received and stored by a computer. The source document(s) are analyzed, the analysis including determination of respective content values for portions of the source document(s). One or more of the portions are selected based at least partly on their respective content values. Coreferences are resolved in the selected portion(s). The selected portion(s) are transformed based at least partly on the resolved coreferences. Transformation can include simplification of sentence forms, such as splitting compound sentences into two or more simple sentences, or standardizing vocabulary. The transformed second portion(s) can be stored as second version documents. The second version document(s) are reverse parsed using a pattern library to select one or more fragments from the second version document(s). The selected fragment(s) are transformed into questions.

In some examples, one or more data structures can be initialized, the data structures being configured to maintain parsed or symbolic representations of source document content. One or more of the selecting or transforming operations can read or write to associated data structures.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIGS. 3A-3K depict a condensed example of how interweaving multiple layers of selection and transformation can be used to produce questions from an input document, according to disclosed technologies.

FIGS. 4A-4N depict example source code for combined semantic-syntactic pattern matching.

FIGS. 5A-5R depict example source code for combined semantic-syntactic pattern matching.

FIGS. 6A-6M depict example source code for question and answer transformation.

DETAILED DESCRIPTION

Overview

Figure 1A:
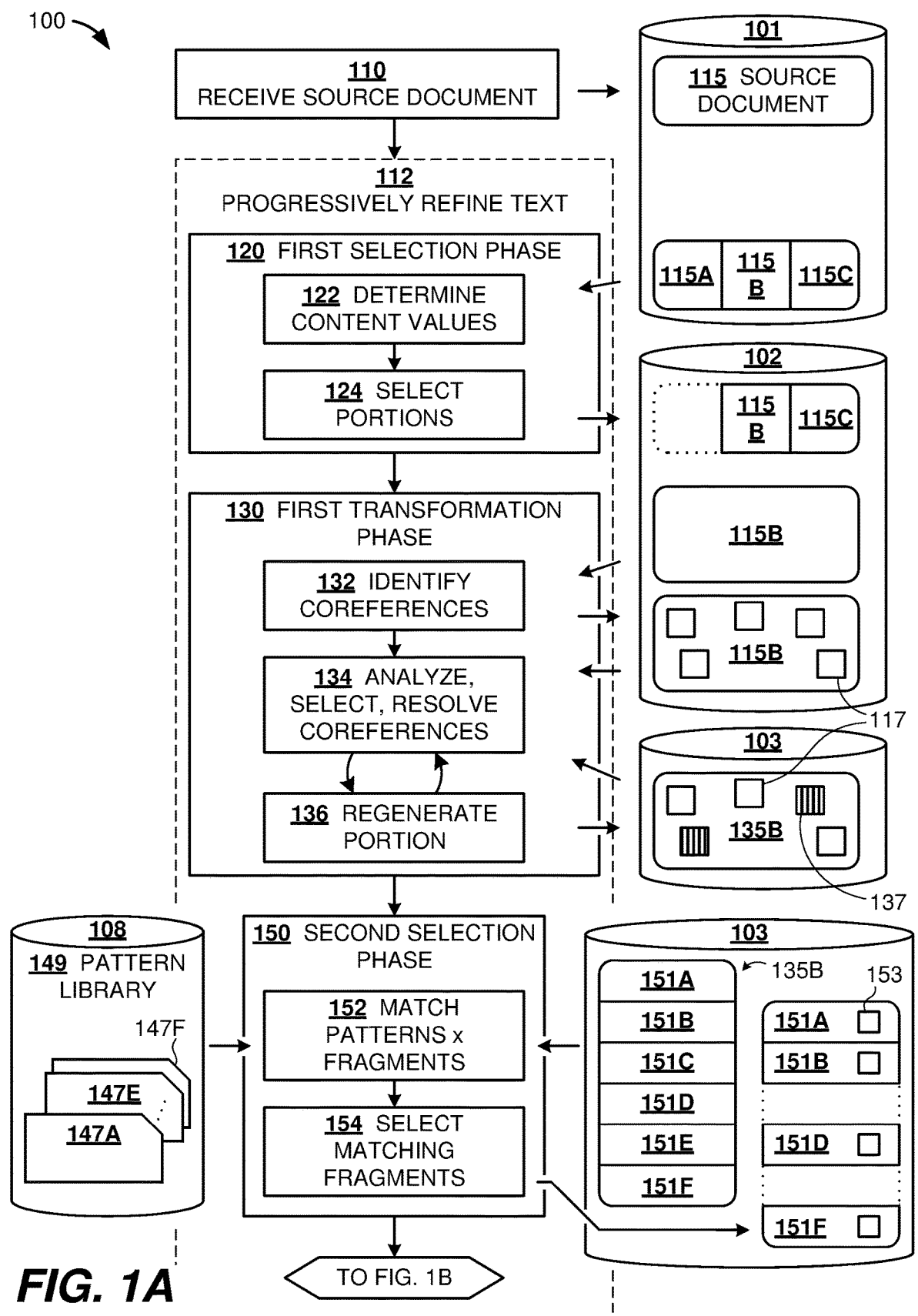
FIGS. 1A-1B depict a flowchart of a first method for question generation according to disclosed technologies.

Challenges in computerized processing of natural language arise from multiple sources. Natural language is a particularly rich form of expression, in which similar ideas can be conveyed in a multitude of ways. Some of these ways can be more equivalent or less equivalent, and can have nuanced differences depending on context. Of course, similar expressions can also be explicitly qualified in innumerable ways with adjectives, adverbs, and similar phrases. Natural language can also be expressed in forms that are colloquial, idiomatic, ungrammatical, ambiguous, or have other deviations from a spartan emotionless expression.

Extracting meaning from natural language is further complicated by the interplay between syntax and semantics. For example, in "Mary tried to call her mother, but she wasn't home", the word "she" would be understood to refer to Mary's mother, while in "Mary tried to call her mother, but her cell phone wouldn't connect to the network", the word "her" would be understood to refer to Mary. That is, correct parsing of the sentence requires understanding semantic clues. Additionally, meaning can be developed over non-local relationships in a text passage, or can even require external knowledge.

In the field of question generation, it is desirable to provide good coverage of source content. A conventional approach to question generation can lead to coverage of portions of a source document that have simple sentence structure, while ignoring more complex passages with more subtle or more interesting content. The disclosed technologies have been applied to professional level educational materials, and have demonstrated coverage of 80% or more, over varied and complex writing.

It is also desirable to be able to generate questions capturing more complex content than rote recall of a simple fact. Bloom's taxonomy has been used to classify levels of learning objectives, or cognitive domains. Bloom's original (1956) cognitive domain levels, from simplest to most complex, are (1) remembering, (2) comprehending, (3) applying, (4) analyzing, (5) synthesizing, and (6) evaluating. It is not particularly difficult to convert a simple sentence such as "Mary called her mother" into an interrogative question "Who did Mary call?" at Bloom's level 1, however, generating questions at higher domain levels requires more sophisticated techniques as disclosed herein. The disclosed technologies have been applied to generate questions at levels 2 and 3, beyond what has been previously been achieved.

In short, the disclosed technologies adopt an approach of successive refinement in stages to simplify text, identify and extract semantic content, and obtain digested fragments of text that can automatically be transformed from a fragment having a known pattern into a question and answer pair. The stages leading to the digested fragments successively or collectively increase the proportion of digested content from a source document. Each stage acts on the output of one or more prior stages and/or on an original source document; in examples, stages of the refinement process can be iterated.

The digested fragments of text, in structured form, can include semantic attributes or metadata, which can provide emphasis or contextual attributes derived through the successive refinement process. In case of ambiguities, attributes can include a probability that the fragment correctly interprets an original source document.

Through such an approach, a number of advantages can be achieved. In examples, the output questions, answers, or distractors can be of better quality than conventional techniques, with a reduction (and often elimination) of unacceptable output. Quality can be measured by human raters, who can judge output for syntactical accuracy or quality, semantic accuracy or quality, or inability to detect that the output was not generated by a person. Quality can also be assessed according to majority vote of multiple raters, or according to unanimity. In some examples, the percentage of grammatically correct sentences, questions, answers, and distractors can be higher, even dramatically higher than obtainable by conventional techniques. In further examples, the subject matter relevance of questions, answers, and distractors to the most important sections of the source document can be judged improved as compared to conventional techniques. Using the disclosed technologies, quality of distractors (such as external distractors) is found to improve as more documents are input. These documents can be in the form of an external corpus, whereby more documents results in more available domain knowledge from which distractors can be drawn. Alternatively, these documents can be in the form of a succession of source documents, in which case quality improvement can arise from process refinement as described further herein. Additionally, the disclosed technologies have demonstrated the ability to generate plausible distractors over a wide range of input domains and can be quickly trained for additional domains.

Terminology

A "question" is a piece of text designed to elicit a response, for example for the purpose of assessment. Interrogative questions are commonly single sentences, so-called wh-questions based on a wh-word such as "who", "when", "where", "what", "why", or "how". An example of an interrogative question is "When was the Declaration of Independence signed?" Cloze questions are sometimes known as fill-in-the blank, e.g. "_____ was the first President of the United States". Other types of questions exist. In a true-false test, the "question" could simply be a statement, e.g. "The Constitutional Convention took place in Baltimore". A question could be a prompt or instruction, e.g. "Describe the factors influencing Washington's decision to cross the Delaware River". A desired response is generally termed an "answer". While many questions have a single and unique correct answer, other questions admit more latitude: an answer could have multiple substantially equivalent forms (i.e. answer is not unique), or there could be multiple correct answers (i.e. there is not a single answer).

Multiple choice questions can resolve some issues of answer indeterminacy, and can be used for other reasons as well. For multiple choice questions, it can be required to formulate incorrect answers, dubbed "distractors". Desirably, a distractor is not merely distinct from a correct answer, but should be unambiguously incorrect (e.g. not a synonym of the correct answer) and plausible.

"Text" is used as a generic term to refer to meaningful expressions of language in various forms. Although the word "text" suggests written text and its equivalents, the term is not so limited and could include speech. "Unstructured" text (also, "natural" text) refers to commonplace linear flowing text such as this disclosure. Although punctuation does provide some organization, "punctuated" text is considered to be unstructured. "Free form" text, such as in a telegram, some speech transcription, or speech, lacks punctuation and is also unstructured. "Structured" text is a representation of text in an organized data structure, commonly obtained from analysis and/or transformation of unstructured text or other structured text. An example of structured text can be output of a parser, where sentences are resolved into e.g. subject, verb phrase, and object, with further resolution of phrases and dependent clauses. Some structured text can be organized in tuples, or as a tree; arrays and other data structures can also be used. A "tuple" is an ordered set of text tokens. An N-tuple is a set of N tokens. Examples of 2-tuples include <Subject|Predicate> or <Noun phrase|Verb phrase>; an example of a 3-tuple is <Subject|Verb|Object>. The ordering of tuple components can differ from the ordering of the corresponding natural text components. 2-tuples and 3-tuples are also denoted doubles and triples, respectively.

This disclosure attempts to use consistent terminology for various forms of text across various stages of processing. A "document" is machine-readable unstructured text input, commonly but not necessarily punctuated. Although a document is commonly multiple pages, that is not a requirement; in examples, a document could be a single paragraph or even a single sentence. A "portion" of text can result from selection or transformation of text at an earlier phase of methods described herein; a portion is commonly multiple sentences, multiple paragraphs, or more, but can be a single sentence. A "fragment" of text can result from selection or transformation of text at a later phase of the described methods, from which one or more questions can be readily obtained. A fragment is commonly a single sentence (which, due to earlier transformations, may not correspond exactly to a single sentence of the original source document) can be associated with a single factoid or nugget of information; however, this is not a requirement. In many instances multi-sentence fragments can be used to derive questions; a fragment can also be less than a whole sentence. Finally, during generation of questions, answers, or distractors, specific tokens or groups of tokens can be selected from a fragment of text in order to form the question, answer, or distractor; such tokens or groups of tokens are dubbed "snippets". In examples, unstructured and structured bodies of text are maintained side-by-side. Thus, terms such as "portions", "fragments", "snippets", and other similar terms can refer to either or both structured or unstructured forms of text. Additionally, any of the above terms can exist in multiple versions, either in sequential versions formed as a result of operations on earlier forms or versions, or in parallel versions if multiple alternative branches are being considered.

Moreover, and particularly for generation of distractors, "fragments" or "snippets" need not be derived from the same source document(s) providing the content from which questions are derived. External distractors can draw upon outside text, such as a corpus. A "corpus" (plural "corpora") is a collection of one or more text documents or ontologies, associated with one or more domains of knowledge. Examples of corpora include Wikipedia, the New York Times archive, or a collection of biology textbooks.

"Syntax" and "syntactic" refer to the grammatical structure of text, in particular the role or relation of various text entities according to the grammar. "Semantic" refers to the meaning of text entities (for example, according to an ontology), the meaning imparted by relationships between text entities, or inferences that can be drawn from the text. "Lexical" refers to a vocabulary or words or expressions, as used in a text or in a domain, or found in a dictionary. An "expression" is an ordered collection of one or more words that can optionally form a syntactical unit (such as a clause, phrase, or sentence) or a lexical unit (such as a dictionary entry). A "grammar" is a set of rules for construction of sentences or other units of text from the vocabulary of a language.

A "coreference" is an instance in text where two or more different expressions refer to the same person or thing. A "proform" is a generic form (commonly pronouns such as "they" or "it", but also pro-verbs, pro-adjectives, or other parts of speech) that can refer to an expressly named equivalent (e.g. "John" or "box"). A proform that follows a defined antecedent is a cataphor, while a proform that precedes its definition is an anaphor. Coreferences need not include proforms, for example "Dr. Elizabeth Smith", "Elizabeth", "Liz", "Dr. Smith", and "the doctor" could be coreferences. Coreferences within a same portion of text are "endophora", while a term that requires external information to resolve is an "exaphor".

An "ontology" is a structured organization of terms, concepts, and/or relationships for one or more knowledge domains. Google™'s Knowledge Graph is a broad ontology; many ontologies over narrower domains exist, such as the Open Biomedical Ontologies or the Chemical Information Ontology. An ontology can have a complex web of connections between its constituent entities. A "taxonomy" is a type of ontology often associated with classification, and commonly organized as a tree. A "dictionary" is a form of ontology organized by a key (e.g. a word being defined), sometimes organized or conceptually considered to be linearly organized, although it can also include links between constituent entities. A "vector space description" of a domain, created by a tool such as Word2Vec, is a particular type of ontology.

A "subject matter descriptor" is an object that distinguishes subject matter of a text body from a universe of subject matter. A subject matter descriptor can be a single item, such as "heart" or "causes of cardiac arrhythmia", or can be a collection of related or unrelated single items defining a span of subject matter, such as {"rose" "carnation" "tulip"} or {"automotive heating and cooling systems" "automotive braking systems" "criteria for choosing an automobile mechanic"}. A subject matter descriptor can be represented as unstructured text, as structured text, as one or more points or regions in an ontology, or as coordinates or volumes in a vector space description.

A "data capture model" is a specification for extraction of syntactic, semantic, or other components from text, for example by a combined semantic-syntactic parser. A data capture model can be in the form of a human-readable document or machine-readable software code.

As used in this disclosure, "selected from" and other related forms refer explicitly to an act of selection. As a matter of convention and for clarity, periods have been omitted from example sentences quoted inline.

Occasionally, and where clear from the context, one or more of the above-defined terms could be used in a different sense from that defined.

A First Example Method

Figure 1B:
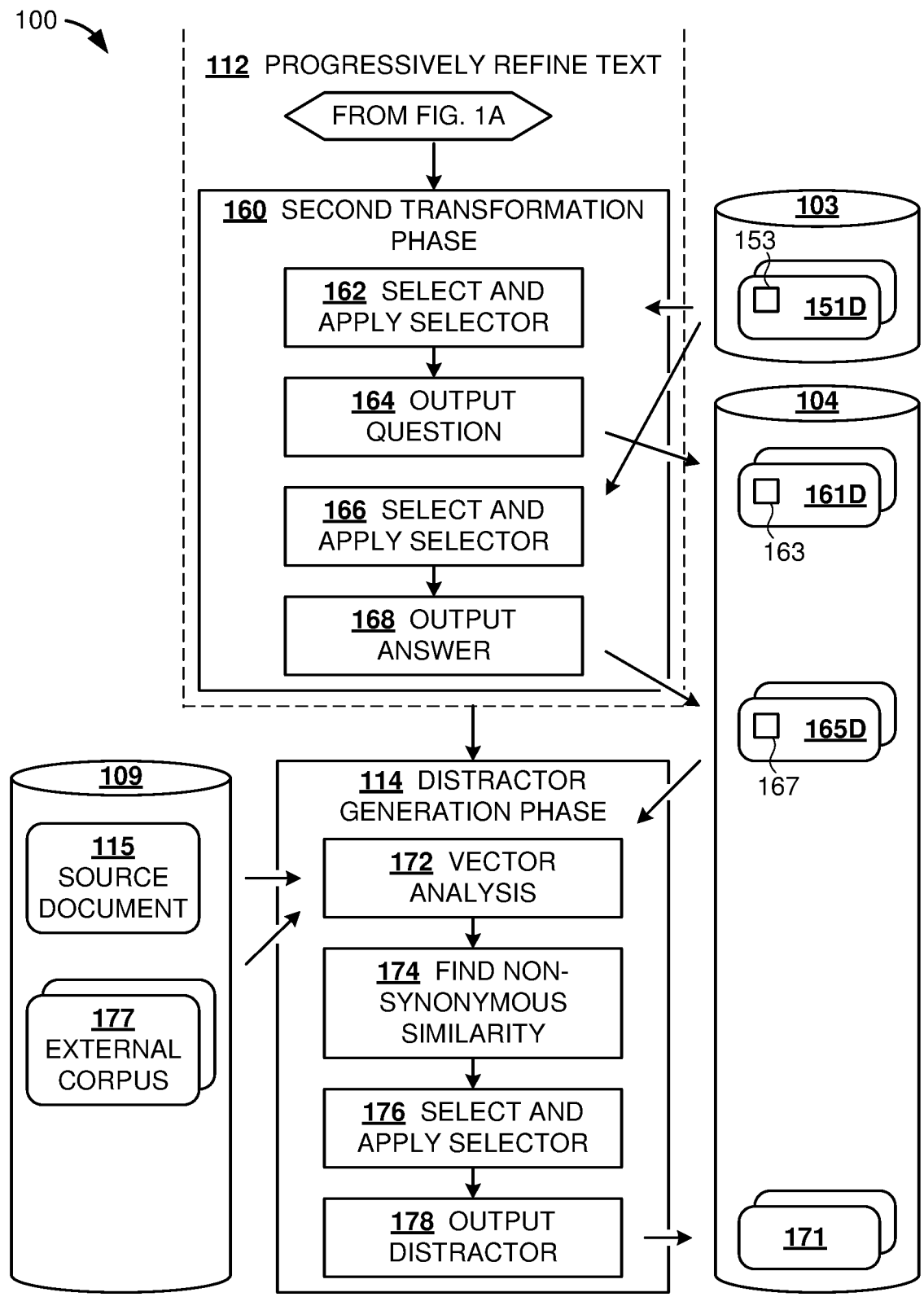

FIGS. 1A-1B depict a flowchart 100 of a first method for question generation according to disclosed technologies. This computer-implemented method entails receipt of a source text document at process block 110, progressive refinement of text at process block 112 with an alternating sequence of selection and transformation phases leading to question and answer generation, and subsequently distractor generation at process block 114. Evolution of data structures over the course of the method are also described. The method can be embodied as machine-readable instructions on non-transitory storage media which, when executed by one or more computer processors, cause the method to be performed.

At process block 110, a source of unstructured text is received and stored as source document 115 in a storage system 101. Source document 101 contains unstructured text material from which questions, answers, and optionally distractors can be generated. Storage system 101 can be physical storage in the structural form of a hard disk drive (having magnetic media), an optical drive (having optical storage media), solid-state memory, cloud storage (having one or another form of physical storage), or other such forms of data storage as described herein or known in the art. The method also involves storage systems 102-104 and 108-109, which can be similar to storage 101. One or more of these storage systems can be the same storage system.

The method proceeds to process block 112 for progressive refinement of source text. The first phase of refinement is selection phase 120. At process block 122, portions 115A-C of the source document 115 can be read from storage and analyzed for content value, which is a measure of content significance for a domain or topic of interest, and can be defined as a similarity score of an instant text portion relative to a vector space description (or other ontology) of the domain or topic of interest. At process block 124, based at least partly on the content value scores, text portions 115B-C can be retained and written to storage, while portion 115A can be discarded. In examples, a text portion can be selected for retention if its content value score exceeds a content value threshold, relative to at least one subject matter descriptor for the source document. A source document can have one, two, or more subject matter descriptors according to varying breadth and depth of subjects covered. A selected text portion can be well matched to one or more of the subjects covered, but need not have similarity above threshold for all of the source document subjects. Text portions can be sentences, paragraphs, pages, chapters, or other suitable units. For purpose of illustration, source document 115 is illustrated as having three portions 115A-C. However, in examples, the number of portions can be much greater, 10-100, 100-1,000, 1,000-1,000,000, a million to a billion, or even higher.

Although phase 120 is shown as a single pass through process blocks 122, 124, in other examples, the selection of text portions at process block 120 can be iterative or hierarchical, and can proceed from larger portions of text to successively smaller portions of text. For example, if source document 115 is a newspaper, and the topic of interest is an election, then entire sections, pages, or even articles can be culled at a high level before a more detailed paragraph or sentence scan is done through retained articles. The high level culling can be based on entire text, or based initially on titles to reduce processing time. Content values of larger units of the source document can be applied to the content analysis of smaller units, so that the same exact sentence (e.g. "A decision will be made on Thursday.") could be retained in one article but discarded in another. That is, the content value of a first portion of text can be partly based on the content value of a larger portion of text containing the first portion.

The method proceeds to transformation phase 130. At process block 132, selected portions of text such as portion 115B can be analyzed to identify coreferences (particularly, proforms, but generally anaphora, cataphora, endophora, or exaphora), which can be marked in association with portion 115B as indicated by open squares 117. At process block 134, the coreferences can be analyzed; some having a high probability of correct resolution can be selected and resolved. The coreferences can be classified into types having varying ease or likelihood of correct resolution (henceforth, probability of correct resolution is dubbed "PCR"). Initially, coreferences of the easiest type can be selected. In examples, pronoun anaphora having same-sentence resolution can be the easiest type, for example "he" in "Bob said he likes cheese". The type classification can implement semantic analysis. For example, "she" in "Bob said she likes cheese" is unlikely to have same-sentence resolution, and can be classified differently than "Bob said he likes cheese". And even the sentence with "he" could have alternative resolutions depending on context, for example, with a preceding sentence "Alice asked what kind of sandwich they should get for Carl, who hadn't arrived yet", "he" is more likely to resolve to Carl than Bob Thus, coreferences can have alternative resolutions with respective PCR. Accordingly, through a combination of syntactic and semantic analysis of the text portions 115B, most probable resolutions of at least some of the selected coreferences (those of the easiest type) can be determined. Even within a type, the PCR of different instances can vary. The text portion can be regenerated and stored with resolved coreferences (shaded squares 137) at process block 136. The method iterates process blocks 134, 136 until all resolvable coreferences have been resolved, or until a predetermined threshold is reached. Each iteration can select, analyze, and resolve coreferences of successively more difficult types of coreference. In examples, as coreferences are resolved, the PCR for the remaining unresolved coreferences can increase, on average. The threshold, for coreference resolution, can be a probability value (e.g. 51% or 80%). Coreferences having a PCR greater than or equal to the threshold can be resolved, while coreferences having a PCR less than the threshold can be left intact. That is, the iteration of process blocks 134, 136 can terminate when all remaining coreferences have PCR below the threshold. The PCR can be retained along with the coreference instances, for both resolved and unresolved coreferences. A PCR can change over iterations of process blocks 134, 136. Resolution of a first coreference on a first round, can significantly increase the PCR of a second coreference. Alternatively, the resolution of the first coreference can make the second reference more ambiguous, decreasing its PCR. In the latter circumstance, examples of the method can undo the first coreference resolution (or, choose a different resolution of the first coreference) in a corrective attempt to find a consistent interpretation of the entire text portion. That is, a resolved first coreference can be replaced with an alternative resolution to obtain improved PCR for an unresolved second coreference. In some examples, the alternative resolution can be a second most likely resolution of the first coreference, while in other examples, PCR for the first coreference can be recomputed and the alternative resolution can be selected based on the recomputed PCR. Examples of the method can also maintain multiple branches of the coreference analysis, e.g. retaining two or more cases (e.g. "he" could be "John" with PCR of 56% or "Paul" with PCR of 44%) until at a later time a preferred resolution can be made with greater certainty.

Besides being iterative and reworkable, coreference resolution can be non-local in multiple ways. First, coreference resolution can depend on material that is not present within an instant portion. Rather, the information required for resolution can be in another retained portion (such as 115C), in an unretained portion (such as 115A), or as general knowledge of the domain. For this reason the original source document 115 can be preserved and accessible, and transformation phase 134 can have access to an external domain ontology. Second, it may not be possible to satisfactorily resolve a particular coreference during a first execution of transformation phase 134, but a preferred resolution could become clear later in the method.

After termination of the first transformation phase 130, the method proceeds to second selection phase 150 where fragments 151 suitable for question generation can be identified and extracted. A portion 135B, with resolved coreferences, can be treated as a collection of fragments 151A-151F. In varying examples, a fragment 151A-151F can be a single-sentence or a multi-sentence fragment. At process block 152, fragments 151A-151F can be read from storage 103 and matched against combined semantic-syntactic patterns 147A-147F read from pattern library 149 on storage 108. In brief, a combined semantic-syntactic pattern can be a collection of nodes having attributes and relationships. The nodes can represent respective syntactic parts of text (e.g. subject, predicate, verb phrase, object, adjective, dependent clause). Nodes can have attributes (e.g. a semantic attribute classifying a name as a male person or a female person, or an emphasis attribute distinguishing e.g. "doesn't" from "never does", or "we won't lose" from "we will not lose"). A semantic attribute can indicate a category of a noun, verb, or other part of speech. Pairs of nodes can have relationships, such as placement order (e.g. subject before or after predicate), or relationships defined by conjunctions (e.g. "and" or "or") or prepositions (e.g. "to", "after", or "in").

Matching can be performed by comparing nodes, attributes, and relationships between a given text fragment and a given pattern to determine a matching score. In examples, a component matching score can be determined for each individual node, attribute, or relationship, and the overall matching score can be determined by combining the various component matching scores. If the matching score is at least equal to a matching threshold, then a match can be determined. As matches are found, the matching fragments can be selected and stored on storage system 103. In the illustration, matches have been found for fragments 151A, 151B, 151D, and 151F (generically, 151*m*), while no matches were found for fragments 151C, 151E. A given fragment can have multiple matches. Alongside the matching fragments 151*m*, identifiers of the matching patterns can be stored, as indicated by open squares 153.

After completion of the second selection phase 150, the method proceeds to second transformation phase 160 where fragments (e.g. 151D) can be processed to generate questions (e.g. 161D) and answers (e.g. 165D). At process block 162, a fragment 151D and its matching pattern(s) 153 can be retrieved from storage 103. Each pattern can be associated with one or more question selectors leading respectively to different questions. Based on the pattern 153, a question selector can be chosen from a selector library (not shown). The question selector can be applied to the fragment 151D to obtain a snippet (not shown). At process block 164, a question 161D can be formed from the snippet and output to storage 104. In examples, a tag 163 indicating the question selector used can be stored with question 161D. An answer 165D can be formed similarly. Based on the pattern and the instant question selector, an answer selector (complementary to the question selector) can be chosen and applied to the fragment 151D at process block 166 to obtain an answer snippet. At process block 168, the answer snippet can be formed into a correct answer 165D and output to storage 104, completing the text refinement operations 112. In examples, a tag 167 indicating the answer selector can be stored with answer 165D.

In some examples, distractors can be required, for which the method proceeds to distractor generation phase 114. Vector analysis can be applied to compare the correct answer 165D with text from a distractor reference which can be either source document 115 or an external corpus 177. At process block 174, an instance of non-synonymous similarity can be found in the distractor reference. This instance and the answer 165D have a similarity measure within a predefined range. The lower bound of the predefined range can be set to exclude greatly dissimilar text leading to implausible distractors, and the upper bound of the predefined range can be set to exclude highly similar text leading to synonyms of the correct answer 165D. Because a distractor should be unambiguously incorrect, an instance synonymous with the answer is unlikely to result in a viable distractor. Thus, the non-synonymous requirement sets an upper bound on the predefined range. At process block 176, an answer selector can be applied to the non-synonymous similar instance to extract a snippet, and at process block 178 this snippet can be formed into a distractor 171 and output to storage 104. In examples, distractor 171 can be cast into a syntactic form the same as or similar to answer 165D. Where distractors are formed from instances found in source document 115, the distractors can be termed internal distractors. Where the instances are found in an external corpus, the distractors can be termed external distractors. Creating a vector space description of any distractor reference can be done prior to or separately from execution of process block 172. A current source document 115 can also be added to corpus 177 for future use.

With this disclosure in hand, one of ordinary skill will appreciate that many variations of this method are possible, beyond those described above.

A Second Example Method

Figure 2:
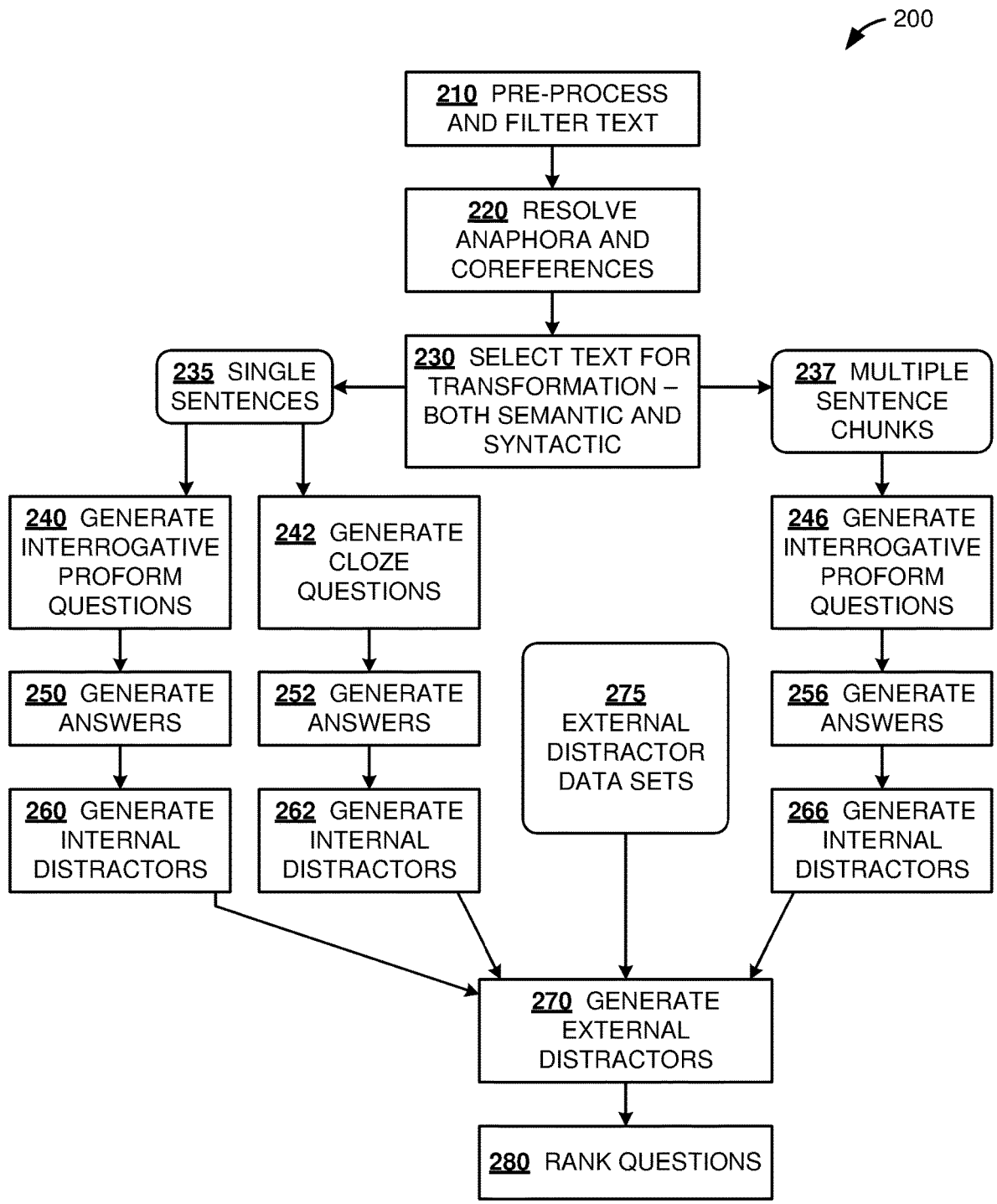
FIG. 2 is a flowchart of a second method for generating questions, answers, and distractors from text, according to disclosed technologies.

FIG. 2 is a flowchart 200 of a second method for generating questions, answers, and distractors from text, according to disclosed technologies. The second method covers generation of different types of questions by a computer system, and also includes generation of answers and distractors.

At process block 210, received text can be pre-processed and filtered. In examples, pre-processing can include elementary parsing, correction of mistakes, and/or evaluation of content. Features of the overall document, as received, can be identified and used to select portions of text, based on a semantic analysis, that can be regarded as likely to include key ideas, concepts, and facts that merit assessment. For example, in an article related to cardiology, Word2Vec analysis could be used to identify sentences having scientific content and those unlikely to have scientific content. A sentence such as "This paper is supported by an X Foundation grant to the Y Center for Research" could be found unlikely to have instructional content and could be selectively removed.

Filtering can also be based on identification of paragraphs and/or discrete text chunks of related sentences having low content value, using rules-based analysis and/or pre-trained models to predict a content value for paragraphs or text chunks. Filters can also be used to expand acronyms, perform clean-up of spelling and punctuation, and remove text with embedded images and symbols (e.g. mathematical formulas or icons) which cannot be parsed by the system.

At process block 220, anaphora and other coreferences can be identified and resolved. Coreference resolution here refers to the entity resolution of endophoric references (either anaphoric or cataphoric), where there can be a one-to-one relationship between the anaphor and the cataphor, and the proform can be replaced with its twin. Rows 1 and 2 of Table 1 illustrate simple examples. However, coreference resolution is used in a broader sense herein, to encompass other types of relationships, for example one-to-many relationships between anaphors and cataphors, non-entity types of coreference, or exaphora. Rows 3-5 of Table 1 show further examples. In Row 1, "her" is an cataphor that can be resolved to pertain to "Mary" and then replaced. In Row 2, "her" is an anaphor that can also be resolved to "Mary", while "she" is an anaphor that can be resolved to "Mary's mother". In both these examples, "her" and "Mary" occur in the same text and are endophora. In Row 5, "there" references something (the room) that is not in the text, and is thus an exaphor. "Her" and "they" are examples of proforms which are pronouns, while "that" and "there" are proforms which are not pronouns.

TABLE 1

| Row | Coreference Resolution Examples |
|---|---|
| 1 | Her mother tried to convince Mary to call more often. ➜ Mary's mother tried to convince Mary to call more often. |
| 2 | Mary tried to call her mother, but she wasn't home. ➜ Mary tried to call Mary's mother, but Mary's mother wasn't home. |
| 3 | Jim rode a bicycle, and Tom rode a scooter. They arrived at the park at the same time. ➜ Jim rode a bicycle, and Tom rode a scooter. Jim and Tom arrived at the park at the same time. |
| 4 | The car broke down, and that was a big problem. ➜ The car broke down, and the car breaking down was a big problem. |
| 5 | Mark didn't see her come in, but suddenly Jill was there. ➜ Mark didn't see Jill come in, but suddenly Jill was in (the same room as Mark). |

Coreference resolution can be done in a filtered, sequential fashion. The types of coreference can be ranked from "easiest" to "hardest" (e.g. simple entity coreference within a single sentence or adjacent sentences is easiest), and coreference instances can be organized according to type. Starting with an instance of the easiest type of coreference, a greedy approach can be used to replace secondary forms with their respective primary forms (e.g. replace proforms with their defined coreferences) until a certain threshold is reached. The threshold is a numerical value derived from a trained model that describes the probability that a given secondary form (e.g. a proform) can be correctly resolved by an instant coreference pattern. After the easiest type of coreferences have been processed, the method is then repeated on the resulting output text, for the next easiest type of coreference. This approach is applied iteratively until either (a) all proforms are resolved, or (b) the threshold point is reached for the hardest type of coreference. In examples, exaphoric adverb references referring to a broad conceptual context can be the most difficult coreferences to resolve. For any type of coreference, resolution of one or more coreference instances can be deferred.

At process block 230, text can be selected for transformation using patterns combining semantic and syntactic attributes (referred to as "combined semantic-syntactic patterns" elsewhere in this disclosure). The patterns can be derived prior to execution of process block 230 and stored in a pattern library. At run time, previously processed source text, e.g. output of process blocks 210 and 220, can be scanned against the pattern library to find matches, each match being output as a text fragment for subsequent process blocks.

Scanning can be performed in text-major order by running various patterns on a first block of text until one or more matches are found or until suitable patterns are exhausted, and then moving to the second block of text. Alternatively, scanning can be performed in pattern-major order by running a first pattern against an entire portion of text or an entire document, identifying and recording the matches found, and then moving to the second pattern. In further examples, the scanning can be parallelized and executed in parallel by different threads, processes, processing units, or computing systems.

Whereas simple syntactic patterns are commonly triples or 3-tuples, the patterns used at process block 230 can be of higher degree, having at least 10, 20, 50, 100, or even more attributes. Commonly patterns with 10-20 attributes can perform well. A given fragment of text can match multiple patterns. A first match to a pattern of high degree can be regarded as having higher value for question generation than a second match to a pattern of low degree. Thus, the first match can be used preferentially in subsequent phases. Some patterns can have unique usage, for example irregular constructions popularized on television.

Outputs of process block 230 can be single sentence fragments 235 or multiple sentence fragments 237 that closely fit respective patterns. In some embodiments, patterns can be applied to restrict output to one or the other of single sentences 235 or multiple sentence chunks 237, while in other embodiments, a broader range of patterns can be used to obtain both single sentences 235 and multiple sentence chunks 237 concurrently.

Multi-sentence fragments 237 can be generated at process block 230 by detecting combined syntactic-semantic patterns at the paragraph level. Each paragraph can be used to generate the full set of possible multi-sentence frames (e.g. a paragraph of three sentences A, B, C would have 3 possible multi-sentence frames: <A, B>, <B, C> and the entire paragraph <A, B, C>. Each possible multi-sentence frame can be evaluated to see if it is a match or near match for a multi-sentence pattern. Multi-sentence patterns can be similar to those used for single sentences in that they combine both syntactic and semantic features in a single pattern and incorporate features spanning multiple layers. However, multi-sentence patterns can also incorporate features or tests that span multiple sentences. Examples of this include: (a) the same noun-phrase occurs as the subject of successive sentences, and the same or similar verbs appear as the primary verb in the predicates, (b) several sentences in a row contain predicates with close semantic relationships, or (c) specific sequences of adverbs, such as from a family {"first", "then", "finally"}. In other respects, the selection of multi-sentence fragments 237 can be similar to selection of single-sentence fragments 235.

With fragments determined, the discussion turns to the three parallel paths for question and answer generation. Because of the similarity between different paths through flowchart 200, the left-most path through process blocks 240, 250, 260 will be described in some detail, while the discussion of the other paths will be limited to significant or differing features.

At process block 240, single sentence fragments can be transformed into interrogative proform questions. In examples, the transformation is dependent on the particular pattern matched by a given single sentence fragment. Generally, the existence of a matching pattern is sufficient to ensure that the fragment contains enough information for a question-answer pair. Thus, a pattern-specific selector can be used to extract appropriate tokens (collectively, a snippet) from the fragment, and organize the snippet into a question using standard manipulation of text tokens. A complementary pattern-specific selector can extract a corresponding snippet as a correct answer.

Generally, a given pattern can support two or more question-answer pairs. As a simple example, the sentence "John ate an apple" can generate the following questions "What did John eat?", "What did John do with the apple?", or "Who ate the apple?" with corresponding answers. In some examples, all question types are generated and stored, for example while forming a reusable question bank, from which different questions will be selected for presentation on different occasions. In other examples, only one or a limited subset of available questions can be generated. The choice of which selector to use can be based on a variety of criteria, such as random choice, maintaining a balance between question types, or based on context. As an example of the latter, if the entire passage is about John, a question "Who ate the apple?" could have less value than "What did John eat?" Conversely, if the passage is about a family outing for apple picking, "What did John eat?" could have less value than "Who ate an apple?" Such context-based choice of selectors can also be applied in examples where multiple questions are retained for a single fragment. In examples, multiple selectors can be applied, and the choice among question selectors can be made after the correct answers have been determined and scored with respect to the source document or a portion thereof. An answer (e.g. "John") that is broadly matched to text (e.g. a passage that is all about John) can have low value for an assessment and the corresponding question can receive a low score, while an answer that is narrowly matched to e.g. a single sentence of text can have high value for assessment and the corresponding question can receive a high score.

Further, multiple question selectors can be used to support e.g. idiomatic variations in the English language. In some instances, language variations can require atypical removal or addition of a given preposition for a given type of idiomatic usage.

In some examples, the selector-based question can be extended through incorporation of "background context" from the source document, where this can be necessary to produce a stand-alone question, to remove ambiguity, or to otherwise improve question quality. For example, "What did John eat?" could be extended to "What did John eat at the birthday party?" A semantic analysis can be performed on an instant text fragment in relation to its placement within the source document to estimate a likelihood that background context is required, or if background context is to be added, determining what context is required.

Table 2 lists some exemplary transformations from text fragments to interrogative questions. In the example of row 1, the adverb clause "such as by measuring the parallax" can be identified syntactically as qualifying "known", and can be further identified semantically as answering the question "how" the subject associated with "is known" is known. A substitution from "distance of a star" to "distance to a star" can be made, and semantic identification that distance is a calculated quantity so that the question can be put together from "how . . . calculated?" and the subject of the first clause, namely "distance to a star", to arrive at the question indicated in row 1.

TABLE 2

| Row | Interrogative Proform Question Generation Examples |
|---|---|
| 1 | Fragment: If the distance of a star is known, such as by measuring the parallax, then the luminosity of the star can be derived. ➔ Question: How can the distance to a star be calculated? |
| 2 | Fragment: The belt is accessible by removing the right hand panel, which it toward the rear of the compartment. ➔ Initial Question: How do you access the belt? Stand-alone question: A motor coach relies on various belts to keep running. The A/C belt is the most likely to break down. How do you access the belt? |

In the example of row 2, the adverb clause "by removing the right hand panel" can be syntactically recognized as qualifying "accessible", and can be semantically recognized as answering the question "how" the subject associated with "is accessible" is accessible. Thus, an initial question can be formed as shown in row 2. However, through semantic analysis of the context of the text fragment, this question can be perceived as vague, and additional descriptors or decorators can be added to identify that there are multiple belts, and the question pertains to the A/C belt in particular. In this example, the stand-alone question shown in row 2 incorporates text from elsewhere in the source document. In other examples, the final question can incorporate material taken from a corpus or ontology, i.e. material not within the source document.

At process block 250, answers can be generated for the questions of process block 240. For single-sentence transforms, the answer is often a subset of the instant text fragment. To identify this subset, an answer selector can be used complementary to the question selector. In some examples, the answer selector applied to a text fragment returns a frame defined as starting and stopping points within the fragment. A further sequence of filters can be applied to expand, contract, or shift the frame within the text fragment. Expansion and contraction can act to include or remove "decorators" or "descriptors" (such as dependent clauses, adjectives, or other qualifiers). A decorator or descriptor can be required when its omission would render the question-answer pair trivial or vague.

This operational procedure produces a range of possible answers that can be derived from the syntactic structure of the text fragment, and then applies a set of probabilistic models and rules-based tests to determine a "minimum viable answer". A minimum viable answer contains just enough semantic content to properly answer a question in context of a source document. That is, removal of semantic content from a minimum viable answer would result in an answer that can be either incomplete or not sufficiently specific. The minimum viable answer can be dependent on the source document, so that identical questions for two source documents can have different minimum viable answers. For example, the minimum viable answer for a first document could be insufficiently specific in the context of a second document. The minimum viable answer can be determined based on a combination of syntactic and semantic features, as well as a comparison of the candidate answer to the previously determined question.

Table 3 lists some exemplary transformations from text fragments into answers. Row 1 depicts a prior transformation of an instant fragment into an output question. Rows 2-5 depict a sequence of transformations resulting in an output answer. At row 2, the initial answer frame is obtained by selecting text following both occurrences of "determined" that complements the text snippet used by the question selector. The initial answer frame contains two parts of comparable semantic weight, and at row 3 the first part can be discarded in favor of the second part. At row 4, the reduced answer frame can be further reduced by stripping away the descriptor "of starspots", but the resulting answer merely parrots what is already in the question, meaning that the answer of row 4 is a trivial answer. Accordingly, "of starspots" can be added back in at row 5 to produce a minimum viable answer that is the output answer.

TABLE 3

| Row | Interrogative Proform Answer Generation Examples |
|---|---|
| 1 | Fragment: The rotation rate of starts can be determined (by astronomers) through spectroscopic measurement, or more exactly determined by tracking the rotation rate of starspots. ➔ Output Question: How do astronomers determine the rotation rate of stars? |
| 2 | Fragment: The rotation rate of starts can be determined (by astronomers) through spectroscopic measurement, or more exactly determined by tracking the rotation rate of starspots. ➔ Initial Answer Frame: through spectroscopic measurement, or more exactly by tracking the rotation rate of starspots➔ |
| 3 | Reduced Answer Frame: by tracking the rotation rate of starspots➔ |
| 4 | Further Reduced Answer Frame: by tracking the rotation rate➔ |
| 5 | Final Output Answer: by tracking the rotation rate of starspots |

At process block 260, internal distractors can be generated for the questions of process block 240 and the answers of process block 250. In examples, distractors can be generated by operations on the correct answer itself. Such operations can include negation, shifting, pattern-specific operations, or combinations of these. Negation involves transforming a semantic component of the answer into its opposite, for example "The light was on" ➔ "The light was off", or "Mary called her mother" ➔ "Mary's mother tried to call Mary". Shifting involves substituting a component of the answer (this component can be any part of speech) to a related but different component, for example "apple" ➔ "pear", or "John washed his car" ➔ "John painted his car". Pattern-specific operations can be transformations particular to the matching pattern for the instant text fragment, and can be applied to the correct answer or to the text fragment. As an illustration, if the correct answer is "downstream from Luxor on the Nile", then a succession of transformations can result in the following distractors: "upstream from Luxor on the Nile", "upstream from Aswan on the Nile", and "upstream from Aswan on the Kagera".

Turning to doze questions, a vector space description can be used at process block 242 to generate questions from single sentence text fragments 235. Word2Vec or a similar tool can be used to assign a vector value to each word and phrase in the text fragment, as well as a weighted average of all word values. Words or phrases that are closest to the weighted average can be determined to be keywords (i.e. closest to the subject of the text fragment), and can be selected as candidates for gap creation. A battery of filters can be applied to multiple candidates, to choose among the candidates. Filters can include tests for grammatical correctness and tests for candidate position relative to phrase boundaries. With one of the candidates chosen, the doze question can be obtained by replacing the candidate with an underlined blank (sometimes termed a "gap"). Naturally, the correct answer is simply the removed candidate and can be determined or output to a storage medium at process block 252.

With doze question and answer in hand, internal distractors can be generated at process block 262. Again, Word2Vec or an equivalent tool can be used to map words and phrases to multi-dimensional vectors of real numbers and thereby learn word embeddings. Noise-contrastive estimation can also be used.

To generate distractors, the document can be searched for snippets matching the answer. The vector of these snippets can be compared with a vector of the correct answer to find enough semantic similarity to be plausible, but not so much that the snippet is synonymous with the answer. Similarity can be determined by a Kullback-Leibler distance, a cosine distance, rank correlation, or another similarity measure, optionally with weights assigned to the vector space dimensions. Additional rules can be applied to improve the quality of distractors.

Turning to multi-sentence interrogative proform questions, the operation of process block 246 can be generally similar to that of process block 242 described above. However, multi-sentence fragments permit new question selector types. For example, in a paragraph about Thomas Jefferson, a multiple-choice question "Thomas Jefferson was not which of the following?" could be generated, with the distractors generated at process block 266 from the actual fragment content (e.g. "an American founding father", "the principal author of the Declaration of Independence", or "the third President of the United States of America") and the answer generated at process block 256 by the internal distractor techniques (negation, shifting, and pattern-specific operations) described at process block 260. In the present example, a correct answer could be "Secretary of State". That is, for such a question selector, the roles or sequential order between process blocks 256, 266 can be swapped.

At process block 256, the answer can be obtained by varying techniques according to the pattern of the instant text fragment and according to the instant question selector used at process block 246. The example above illustrates where distractor techniques can be used to determine the answer. In other examples, an answer selector that can be complementary to the question selector can yield the answer, similar to the description for process block 250. In further examples, both answers and distractors can be found directly from the fragment by application of suitable selectors.

In like manner, internal distractors can be determined at process block 266 by similar procedures described for process blocks 260 or 256, according to the pattern of an instant text fragment and the instant question selector.

The discussion now turns to process block 270 and generation of external distractors. Where generation of sufficient internal distractors is not possible, or many alternate distractors are needed for each question-answer pair (e.g. for quiz questions that will be reused), additional external distractors can be generated. In some examples, these can be drawn from an external database 275 of potential distractors, which can be grouped by which patterns and question types they could be suitable for. In some examples, this database can be generated automatically by leveraging the same methods described herein for generation of questions and answers from source documents, but applied to an external corpus rather than to the source documents. This external corpus can include other source documents used in earlier projects, and can be grown over time. Satisfactory performance has been demonstrated with external databases 275 obtained from broad scope corpora such as Wikipedia, and also from narrow collections of domain-specific documents such as several tens of biology textbooks.

In other examples, the external distractor data sets 275 can be maintained as an ontology or particularly as a vector space description, rather than being reduced to a database of distractors. In such examples, process block 270 can follow the techniques of process block 246 to search for snippets within the data sets 275 having syntactic match to the correct answer and non-synonymous semantic similarity. Again, an ontology or vector space description used as an external distractor data set 275 can be acquired or derived from broad or narrow corpora.

Then, at process block 280, questions (together with answers and optional distractors) can be ranked. Questions can be ranked based on quality (grammar, coverage of high-value content features, and/or position in the Bloom taxonomy). Additionally, the questions can be collectively scored based on overall coverage of source document content.

Ranking of questions can be based on their semantic relatedness to a set of key words or phrases generated for the source document overall. The key words and phrases can be determined by one or more of the following techniques: a syntactic approach, Latent Dirichlet Allocation, or a technical keyword generator that identifies domain-specific technical terms. Questions that closely match the most important keywords and phrases from the overall document can be assigned high ranks (e.g. 1, 2, 3, . . . ), while questions having a poor match to the set of key words and phrases can be assigned low ranks (e.g. 998, 999, 1000).

Distractors can be ranked based on a determination whether they are likely to pass as indistinguishable from human-created distractors. Distractor ranking can also employ an index of semantic relatedness between key words in the distractor as compared to the answer. Very closely related distractors may not be sufficiently distinguishable from the correct answer and could be ranked low. Very distant distractors may be sufficiently off-topic so as to be readily discarded by a test subject, and could also be ranked low. In between are distractors that have sufficient similarity to be topically related, but not so much similarity as to be synonymous. Distractors in such a range can be denoted as having "non-synonymous similarity" to the answer. By way of illustration, candidates with similarity scores S, relative to the correct answer, below 0.85 can be determined to have ≤2% likelihood of being judged synonymous with the correct answer, while candidates with S>0.93 can be determined to have ≥50% likelihood of being judged synonymous. Also, candidates with S<0.3 can be determined to be have ≥50% probability of being deemed irrelevant, while candidates with similarity scores above 0.6 can be determined to have ≤2% probability of being deemed irrelevant. In this illustration, candidates having similarity scores, relative to the correct answer, between 0.6 and 0.85 are likely to be considered relevant or similar but are unlikely to be considered synonymous, and accordingly 0.6≤S≤0.85 can be used as the range of non-synonymous similarity. In other examples, different thresholds can be used. In this illustration, there is also a range of similarity scores 0.85<S≤0.93 where a candidate is not sufficiently similar to be deemed an acceptable alternative answer, yet not sufficiently dissimilar to be deemed a viable distractor.

A Condensed Example

FIGS. 3A-3K depict a condensed example of how interweaving multiple layers of selection and transformation can be used to produce questions from an input document, according to disclosed technologies. FIG. 3A shows an exemplary input document, comprising unstructured text, such as might be received at process blocks 110 or 710 described herein. A first selection phase, which could be similar to process blocks 120, 210, or 720 described herein, operates on the input document. The first sentence can be determined to lack significant content value, leaving the remainder, shown in FIG. 3B as a selected portion. In this example, the first sentence contains the word "heart"; however semantic analysis of the other nouns in the sentence can determine that there is no domain-relevant content associated with the "heart" in this sentence. Such a determination can be made, for example, by vector analysis, where the first sentence can be found to be far removed from the content of the passage, which relates to the heart, while the remaining sentences can be found to have similarity above a threshold. A first transformation phase, which could be similar to process blocks 130, 220, or 730 described herein, operates on the selected portion. The word "It" at the beginning of the second sentence can be identified as an easily resolvable coreference and can be transformed into "The heart". In this example, "it" is syntactically recognized as likely pertaining to a noun or noun phrase of the preceding sentence, and semantic analysis can be used to determine that beats is more likely associated with "heart" than other nouns in the preceding sentence. Syntactic rules can also assign greater weight or likelihood for the subject of the preceding sentence (i.e. the heart) as compared to the other nouns, which can corroborate the semantic finding. Regeneration of the text provides a second version of the selected portion, as shown in FIG. 3C. For the purpose of this illustration, the word "These" at the end of the third line can also be identified as a coreference, but resolution can be deferred.

A second selection phase (which can be similar to process blocks 150, 230, or 750) operates on the regenerated second version. Six single-sentence fragments can be selected based on matching successive sentences against a pattern library. These six fragments are illustrated in FIG. 3D. In this illustration, another round of transformation and selection, similar to that shown at 784 and 750 of FIG. 7, can be performed. A second transformation phase (which can be similar to process blocks 160, 240, 242, 246, or 760) operates to simplify the selected fragments. As one example, the first fragment of FIG. 3D can be determined to have a complex structure, and the primary clause "The heart is a muscular organ" can be extracted as a separate fragment. As another example, the expression "close to" in the second fragment of FIG. 3D can be transformed to a standard form "about". As a third example, a series of words separated by commas can be transformed into individual sentences. Thus, the third fragment of FIG. 3D can be determined to have an expandable qualifier "In humans, other mammals, and birds", which leads to expansion of this fragment into three separate fragments for humans, mammals, and birds, respectively, in addition to the original fragment. The fourth fragment of FIG. 3D has an unresolved coreference "These", which can be resolved by recourse to an earlier version of the text (e.g. FIG. 3C) in which the context of the fragment can be examined to resolve "These chambers" as "The chambers of the heart", as shown in FIG. 3E. Finally, the fifth fragment of FIG. 3D can be determined to have complex structure and can be split into two separate sentences as shown in FIG. 3E. Subsequent to the second transformation phase, a third selection phase operates to select several of these single-sentence fragments for question generation, as shown in FIG. 3F. Comparison of FIGS. 3D and 3F shows that while some fragments have been kept in original form, other fragments have been replaced by simplified derivative forms, and one of the fragments in FIG. 3D has been eliminated altogether. The single sentence fragments of either FIG. 3D or FIG. 3F can be analogous to the single sentence fragments 235.

FIGS. 3G-3K show representative questions, along with answers and distractors, that can be generated from the fragments of FIG. 3F by methods described herein. The examples of FIGS. 3G-3J are interrogative proform questions (wh-questions, "how", "which", "how many", "what"). FIG. 3K is a numerical doze question.

Example Combined Semantic-Syntactic Patterns

A combined semantic-syntactic pattern is not merely a list of features or attributes with weighted probabilities that can individually or collectively predict an important section of text. Rather, the combined semantic-syntactic pattern can be a very specific pattern of encoding that occur at the level of individual sentences and across groups of sentences or paragraphs. These patterns combine syntactic, semantic, and other features in a single pattern. Components of a pattern can be very general syntactic or semantic features (e.g. "any noun phrase" or "a human entity") or very specific (e.g. "a singular proper noun" or "the preposition 'by'"). Patterns can specify a relative order and/or level of dependency between features, and these can be very general (e.g. "preceded or followed by any number of dependencies").

The ability to combine syntactic and semantic features from multiple levels in a single pattern, and also account for variation due to word order separately is what distinguishes this approach from other rule-based pattern approaches that have been documented in the literature.

The levels can be lexico-semantic levels. For example, at a high-level, a word or expression can be classified as a thing (i.e. not a person or place), while at a mid-level the thing can be a tangible object having physical shape and form. At a low-level, the thing can be specific, as a "loaf_of_bread" (or, "bread loaf"). In lexico-syntactic terms, the high level can indicate a compound noun phrase, the mid-level can indicate a discrete noun phrase, a lower-level can indicate noun, a further lower level can indicate a proper noun, and at a lowest level a particular instance can be identified (e.g. "George" OR "Bob" OR "John"). Semantic levels can follow a branching model similar to a game of twenty questions (from general to specific)—and can be combined with type of level system (from general to specific) for syntax and text-string representations.

Variations in word order can be treated separately from syntactic and semantic relationships. Examples of the disclosed technology rely primarily on syntactic and semantic relations between words or expressions in sentences, or between sentences. However, information about the word order can be retained and used downstream, e.g. in question generation. For example, in a case where a dependent clause may either precede or follow the independent clause to which it is attached, the tree structure of the parsed sentence (including both syntactic and semantic attributes) can be considered, which effectively ignores word order, and attributes indicative of the original word order can be retained. In examples, pattern matching can be effectively performed without consideration of word order, whereas question generation can be at least partly based on word order, for example to decide which "decorators" (e.g. dependent clauses, adjectives, adverbs) can be included in the final question. In examples, nodes of a tree structure representing parsed text can have attributes or tags indicating word order.

The ability to create patterns that cross multiple sentences or paragraphs, is another distinguishing feature. Natural language can encode meaning in multiple ways—semantic, syntactic, lexical, etc. Over the years, multiple schema have been proposed for capturing various dimensions of natural language in machine-readable formats, but none have fully captured (in all cases) the complexity of information conveyed in natural language. The deficiencies of each coding scheme become apparent when applied to solving problems in NLP. Recognizing that the encoding patterns can be complex and can have many dimensions, the presently disclosed technologies were developed by combining existing syntactic parsing schemes, and refining a data capture model by testing on known problem sets, and progressively filling the gaps through feature enhancement. In this manner, semantic capabilities were incorporated into the parser. Combined semantic-syntactic patterns, as disclosed herein, were developed, and found to provide superior results. The combined semantic-syntactic patterns vary in complexity: some can be simple with five or less elements, while other patterns can be complex, with twenty or more elements and constraints in multiple dimensions. A gold standard for evaluation is whether the output can be acceptable to a human and has a low error rate. Additionally, some evaluations can be implemented by machine, for example semantic assessment by comparing against an ontology, or syntactic assessment by comparing results from independent parsers. The data capture model can be further refined by analysis of errors made using relatively complex patterns, and searching for better patterns for such sample text. Such a search can be based on machine learning (ML). Unlike other approaches, the present data capture model provides structured text that can be machine-readable but not easily readable by humans, owing to (i) the multi-layer representation, with abstraction at multiple levels, and (ii) mixed representation, combining code, datasheets, and rule-based constructs, over many layers of ML models. Still, unlike pure large ML models (e.g. seq2seq) which are opaque, each individual level can be readily understood by a human.

Successful results have been obtained with as few as 16 single-sentence pattern types and three multi-sentence pattern types. In examples, a number of single-sentence patterns can be in a range 5-10, 10-15, 15-20, 20-25, 25-30, 30-50, 50-100, 100-200, 200-500, or 500-1000. In examples, a number of multi-sentence pattern types can be in a range 2-5, 5-10, 10-20, 20-50, or 50-100. These pattern types can achieve 60-80% coverage on example professional text, and even higher coverage, e.g. 80-90%, 90-95%, or 95-98% in certain fairly narrow domains. The quality of generated questions can be such that at least 80%, at least 87%, or at least 90% are acceptable by human raters, in varying examples, without any ranking or filtering or questions, answers, or distractors generated by the automated tool. In further examples, ranking or filtering generated questions while maintaining 80% coverage of source text, can be used to obtain at least 90% acceptable questions.

To compensate for quality issues, some conventional techniques take a brute force approach and generate considerably more questions than necessary, followed by ranking to discard inferior or unsatisfactory questions. However, such an approach can remove poorer quality questions to some extent, but is unable to generate better quality questions comparable to the disclosed technologies. Combined semantic-syntactic patterns of high degree (in examples 10-20, 20-30, 30-50, or even higher), as disclosed herein, can generate better quality questions (as measured by human raters, or based on levels of Bloom's taxonomy) than conventional techniques, and with a higher yield of acceptable questions.

As to the generation of patterns in the pattern library, machine learning (ML) and/or formal rules can be used to identify combined semantic-syntactic patterns that encode important information in text. Adaptations of well-known parsers and tools such as Google's Tensor Flow and OpenNLP can be used to parse and tag text to the requisite level of detail, and a machine learning model can be trained to identify patterns suitable for a particular domain, using an appropriate corpus.

For the run time, it has been found helpful to specify patterns in a functional scripting language, such as RS2. Examples and a description of this language can be found on the Eduworks website. RS2 can be used to wrap various tools and libraries and use their outputs as patterns in a broad range of sequential and branched filters. These patterns can be applied analogous to how regex is used, of course with semantic-syntactic patterns rather than regex character strings. Low-level constituents of patterns are called "selectors" and can be layered on top of each other to produce sequential filters, in a manner consistent with the functional programming paradigm. A pattern can be a tree structure of filters. Two such patterns, ListfullyComplete and CoreAction are described further herein. Resolution of a selector, e.g. by identifying semantic-syntactic items in a text portion, can be performed through one or more of ontological models or ML models.

Each transform type has a name which can be used as a feature in subsequent machine learning operations. For example, ML can be used to identify patterns of patterns, e.g. paragraph-level patterns of sentence-level patterns. Certain patterns statistically occur more frequently at certain document positions, presumably as a reflection of how humans shift their use of natural language across a narrative or other linear delivery of information, based on shared or personal mental models of discourse and communication.

FIGS. 4-6 show example code associated with the disclosed technologies. The code can be written in a functional language designed to abstract natural language processing (NLP) operations based on semantic and/or syntactic parsers. The code can be written with no variables, and the names of expressions can be reused. The order of code execution can be different from the order in which the code is written, except that where the names of expressions are reused, the closest preceding declaration applies.

FIGS. 4A-4N depict example source code for combined semantic-syntactic pattern matching. This pattern is titled "ListfullyComplete". Its objective is to select lists from the source text (after some selection and transformation) that represent a complete description or list of components of something (i.e. not a list of examples). FIG. 3E shows an example of such a sentence: "The chambers of the heart are: upper left atrium, upper right atrium, lower left ventricle, and lower right ventricle". The ListfullyComplete pattern has a variable number of components, depending on the number of items K in the list, and can be represented as Pattern: subject1→relationship1→(object1+object2+object3+ . . . objectK).

As an additional constraint, relationship1 must imply composition or description, and the objects must be identifiable as subcomponents of subject1, from a semantic perspective.

FIG. 4A shows the definition of the ListfullyComplete pattern. With reference to the example from FIG. 3E cited above, code expression "NP" corresponds to the noun phrase "chambers of the heart" which is the subject of the pattern; code expression "word=':'" corresponds to the ":" symbol which is the relationship of the pattern, and code expression ".sAny( . . . (word='as'))" refers to an optional word "as" which is not present in the example sentence. Code expressions "sNext(pos='NP').sNext(pos=',')" refer to successive objects of the pattern. The last two objects can be separated by a conjunction belonging to "and or". Lists joined by "and" and lists joined by "or" can have different semantic meaning, which can be handled through sub-cases as described below, or through the use of question or answer selectors which can be specific to one of "and" and "or". FIG. 4B shows code for selector1 which executes the ListfullyComplete pattern on each text fragment to extract the abovementioned components and store the components as structured text in a tree. FIG. 4C shows code for keepThese1, which operates on the output of selector1 to verify the list contents in the extracted components.

FIG. 4D shows code for selector2, which operates on verified output of keepThese1 to handle specific sub-cases that include the specific word "following". Similar to keepThese1, the function keepThese2, shown in FIG. 4E, verifies the output of selector2. The ListfullyComplete pattern can also handle lists of types, i.e. where the list of objects represent different types of the subject. This can be handled as a sub-case of the list of components described above. As an example, selector3, shown in FIG. 4F, detects instances of "two types:" and keepThese3, shown in FIG. 4G validates the output of selector3. Another sub-case uses the word "including", which can be understood semantically to mean that the list of objects could be incomplete. Selector4 and keepThese4, shown in FIGS. 4H-4I, handle this sub-case. Additional sub-cases can be considered. FIGS. 4J-4K show selector5 and keepThese5 for the construction ", if needed," while FIGS. 4L-4M show selector6 and keepThese6 for the construction "existing circumstances:". Finally FIG. 4N shows selector7 for handling "two sections:". As this example shows, a pattern for a particular semantic-syntactic form can include a plurality of sub-cases. Sub-cases can be used to handle alternative word choices with different semantic meaning.

Example Core Actions

FIGS. 5A-5R depict example source code useful in semantic-syntactic analysis of text for core operations such as parsing, text simplification, generation of structured equivalents to source text, or other transformations. FIG. 5A shows code for various selectors. The code for removalSelector and removalSelector2 use lists of words, including existential words, that can be deemed not to add semantic meaning. The lists of words can be dependent on domain. For example, words such as "range", "span", or "face" could have significant semantic content in documents describing mountains, bridges, or computer animation. Words or expressions having both semantically significant and semantically insignificant usage are dubbed "dual-use". The lists of words can also be dependent on a particular source document, according to a writer's style. In examples, the lists of words can be automatically generated by analysis of a source document, to determine whether usage of dual-use words is semantically significant, or whether a particular dual-use word can be added to a removal word list. In some examples, removalSelector words can be removed during generation of structured equivalents to source text, while in other examples, removalSelector words can be replaced with standardized alternatives. The code for removalSelector4 identifies forms in which two grammatical sentences ("S") are separated by a comma and a coordinating conjunction ("CC"). Such forms can be simplified into two separate sentences. The code for removalSelector5 is similar, but lacks the coordinating conjunction. The code for nextSelector identifies basic tuples of the form noun-verb-follower, where several different forms for each tuple component are recognized. The code for questionSelector identifies particular verb forms that are well-suited to transformation into a question, while nounSelector identifies particular noun forms.

FIG. 5B show code for various cleaning selectors that support identification and separation of subordinate clauses, for parsing a sentence to find the core verb. CleaningSelector1 identifies clauses beginning with e.g. "However," and its variant cleaningSelector1a is similar, but without the comma. The form with comma can be preferred as being less ambiguous to parse, however the non-comma form is often used as a consequence of ordering of clauses in sentences, including this one. Cleaning selectors 2-4a identify forms such as "for example", "in both cases", or "as one can see", with and without commas. FIGS. 5C-5D show code for a core cleaning function coreSentenceClean1, in which text can be analyzed using the previously defined cleaning selectors, and identified clauses can be split off and stored as structured text in a tree. FIG. 5E shows code for coreSentenceClean, which operates on output of coreSentenceClean1, removing subordinate clauses and regenerating simplified sentences. FIG. 5F shows code for clauseSelector, which identifies subordinate clauses attached to a sentence through a subordinating conjunction (e.g. "while as . . . ") followed by a variety of predicate forms. CoreSentence, shown in FIG. 5G, removes these subordinate clauses and regenerates simplified sentences. FIG. 5H shows function removeThem, which applies removalSelector to filtered sentences and stores identified parts as structured text in a tree. Function keepThese, shown in FIG. 5I, verifies the output of removeThem. Similarly, functions removeThem2 and keepThese2, shown in FIGS. 5J-5K, apply removalSelector2, store the identified parts, and verify the results. FIG. 5L shows removeThem3, looks for sentences beginning with "One" and including "the other" in order to perform text simplification; function keepThese3, shown in FIG. 5M verifies the results. FIGS. 5N-5O show removeThem4 and keepThese4 applying and verifying removalSelector4, and FIGS. 5P-5Q show removeThem5 and keepThese5 applying and verifying removalSelector5. Finally, FIG. 512 shows tuple extraction using nextSelector after various dependent clauses have been removed and other text simplifications have been performed.

Example Question Generator

Like the combined semantic-syntactic patterns used to select fragments, the question and answer selectors can include varying combinations of broad or narrow syntactic or semantic criteria. While many different patterns and selectors can be used, the resulting questions for a given selector could be of a similar format. For example, question generators for the pattern type "ByGerundsBeard" could all result in a "How" question that can be answered with a description of a specific action.

FIGS. 6A-6M depict example source code for question and answer transformation. This pattern is titled ByGerundsBeard. Its objective is to identify single sentences where a traditional tuple (subject→relationship→object) can be accomplished by means of an action specified in a dependent clause as another (relationship→object) double; a 6th element in the pattern can be the relationship between the tuple and the double. The ByGerundsBeard pattern can be represented as Pattern: ((subject1→relationship1→object))-relationship3-(relationship2→object2)). Additionally, the pattern contains constraints on the syntactic and/or semantic nature of the six elements. For example, relationship2 can have the syntactic form of a gerund and can have the semantic attribute that the verb from which the gerund is formed could describe a non-existential action. Relationship1 can also be non-existential, and relationship3 can be defined by one of specific list of prepositions or prepositional phrases. Subject1 can also be the subject of an independent clause, and the source sentence may encode additional information (beyond the specified pattern) that is stored separately. A separate algorithm determines whether the excess information is relevant, depending on the question generation pattern subsequently applied.

As with other patterns, the ByGerundsBeard combined semantic-syntactic pattern can include a plurality of nodes representing respective syntactic parts of a text fragment, associated semantic attributes, and relationships coupling pairs of nodes. The ByGerundsBeard pattern includes five nodes: the tuple, the double, subject1, object1, and object2, as well as the three relationships shown above. Furthermore, the constraints represent attributes: relationship2 has one syntactic and one semantic attribute, while relationships 1 and 3 have one semantic attribute each. In this example, the degree of a combined semantic-syntactic pattern can be defined as the sum of the node count (5), the count of relationships (3), the count of semantic attributes (3), and the count of syntactic attributes (1), for a degree of 5+3+3+1=12. Similar to the ListfullyComplete pattern described above, the ByGerundsBeard pattern can be configured with one or more sub-cases. As sub-cases add constraints, the degree of a sub-case can increase above that of the top-level (or, root) ByGerundsBeard pattern.

As with other patterns, ByGerundsBeard can be matched to a text fragment degree by degree. Each comparison of a node, attribute, or relationship results in a numerical score, which can be one for a perfect match, zero for a perfect mismatch, or varying scores in between. Non-binary scores can be due to different factors, including (i) indeterminacy of resolution or usage of a word or expression being compared, or (ii) a reference attribute of the pattern is non-binary, for example "bright color" would give red or orange a better score than gray or brown. The matching scores of each degree can be combined to derive a composite matching score for a candidate text fragment when compared to a given combined semantic-syntactic pattern. For example, matching scores for each degree can be added or multiplied to obtain a composite matching score. The individual or composite matching scores can be rated against the maximum possible match score. If the matching score is at least equal to a matching threshold, then the ByGerundsBeard processing can continue.

Row 1 of Table 2 provides an illustrative example, "If the distance of a star is known, such as by measuring the parallax, then the luminosity of the star can be derived". Here, the tuple can be <"the distance of a star" (subject1)|"is" (relationship1)|"known" (object1)>, and the double can be <"measuring" (gerund)|"the parallax" (object2)>, joined by "such as by" (relationship3).

The ByGerundsBeard pattern contains sub-selectors for handling additional information (if any) that may be encoded in the source sentence. For example, if the source sentence encodes information that implies that relationship3 connects the tuple to other doubles (that could be encoded elsewhere in the source text), then the extraction results from that sentence can be stored in a separate array with a tag "possible one-of-several".

Turning to FIG. 6A, the code for the "sentence" function selects unique sentences from a given portion of text, after one or more iterations of filtering and transformation that can include correction of spelling, grammar, or punctuation errors (e.g. commas in the wrong place, using a comma to connect two independent clauses, etc.), and separation of complex sentences into simpler separate sentences. Thus, the sentences extracted by the sentence function have a high likelihood of being grammatically correct, and simplified to the extent that simplification can be done without loss of meaning. Also in FIG. 6A is function clauseSelector which defines a sub-selector (a part of a selector) for a specific semantic-syntactic pattern. The pattern must start with one of a specified list of words (e.g. "while as . . . "), which must then be directly followed by a list of one or more semantic and syntactic elements, and the combination of these elements must form a discrete dependent clause in the sentence where it is found.

FIG. 6B shows code for function sentence2, which selects for a sub-pattern where the gerund clause (which may be a candidate to be replaced by a proform) can be qualified as possibly one of multiple possible answers in the source text. In the code below, the qualifier can be removed, and, in the function "sentence" shown in FIG. 6C, the sentence reconstructed without the qualifier. The reconstructed sentence can be stored in a separate array with the (removed) qualifier now represented by a tag, so that the qualifier remains available, if needed later to form a question. As with other analyses described herein, structured or unstructured forms of the reconstructed sentence can be stored. In the illustration of Table 2, row 1, the "such as by" phrase can be matched and the dependent clause can be split off by sentence2. The simplified sentence (without "such as by . . . " clause) can be regenerated using the "sentence" function of FIG. 6C.

FIGS. 6D-6E provide functions for identification and extraction of prepositional phrases. These functions can extract any prepositional phrases from a larger clause containing the targeted gerund (part of the pattern's double). These functions can also extract adverbial phrases, and can store the resulting simplified sentences in tagged arrays (i.e. structured text) with the removed clauses stored separately so that they can be available later for building the question or answer, as needed. For example, prepositionlessSentenceTrimmedNP creates a separate array that selects and stores the first noun phrase ("distance of a star") from the action ("measuring the parallax") that can be accomplished by the gerund ("measuring"). Similarly, prepositionlessSentenceTrimmedVP creates a separate array that selects and stores the core verb phrase ("is known") associated with the noun phrase ("distance of a star") in the previous operation, while removing subordinate conjunctions, if any.

PrepositionlessSentenceTrimmedVPSplit identifies and separately stores the core verb ("is") from the verb phrase ("is known") selected in the previous section of code. The third element specifies that if the core verb is a compound, the auxiliary verb can be in the present tense or can be transformed to this tense when stored (other verbs can automatically be converted to present tense when stored). This can be the core verb of the "relation" from the tuple part of the pattern. OkVerbs in FIG. 6F provides a list of acceptable present tense verbs.

The code of FIGS. 6A-6F described above, can dissect the input sentence into its component parts and attempt to populate a pattern array with the six required components for this pattern. Then, FIG. 6G shows question generator prepositionlessSentenceTrimmedQ (one of several generators for the Gerund's Beard pattern), which uses the information in the capitalized components of the pattern to form a question. ((SUBJECT1→RELATIONSHIP1→OBJECT1)-RELATIONSHIP3-(relationship2->object2)). This question generator can be applied when no additional information outside of the original six elements is judged to be relevant or required for the formation of a question. Thus, this question generator can pick up "can" (from the okVerbs list) as argument b, "distance to a star" as argument d, and "be known" as argument f. FIG. 6H shows a function to fix punctuation and spaces in an initial question. Further semantic analysis can enable transformation of "be known" into "be calculated". In this manner, the complete question (see Table 1, row 1) "How can the distance to a star be calculated?" can be obtained.

A final step in transformation involves extending the original question with "background context" from the source document, where this is necessary to produce a "stand-alone" question. Extension of a question can include analysis of the relative placement of the selected text in the source document, together with the structure of the question that was generated, and estimating thereby the likelihood that the question requires background context to stand alone. The analysis can also include selecting background text from the source document to provide the necessary context.

Turning to answer generation, a complementary answer generator uses these capitalized components of the pattern to form a question. ((subject1→relationship1→object1)-relationship3-(RELATIONSHIP2→OBJECT2)). The correct answer is simply "by measuring the parallax".

Some analysis can be performed prior to distractor generation. FIG. 6I shows code for answerKeywords, which removes stop words from the double, and code for answerKeywordNouns. The latter, together with filterTags, gerundFIlter, and gerundFilterIf, shown in FIGS. 6J-6L, identify the core semantic-syntactic profile of the answer, which can be used later to identify appropriate distractors.

Following generation of the correct answer and the profile analysis, the function answerSet, shown in FIG. 6M, can be used to search for internal distractors within the source document. AnswerSet can be used to look for distractors both within and outside the source document text, based on semantic and syntactic distance from the correct answer (specified by levels, e.g. distractorKeywordsLevel1 and distractorKeywordsLevel2).

A Third Example Method

Figure 7:
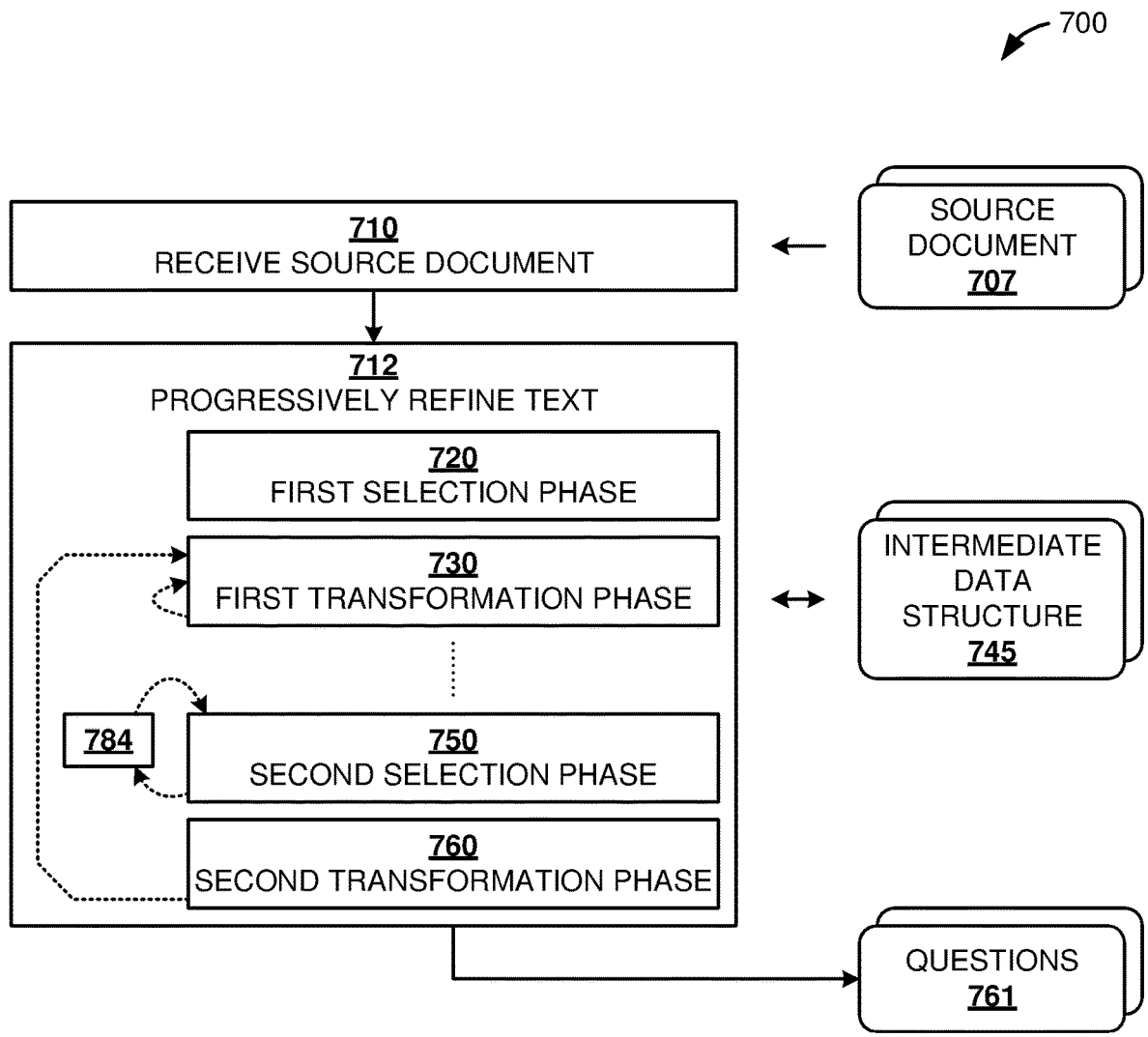
FIG. 7 is a flowchart of a third method for generating questions from source documents. according to disclosed technologies.

FIG. 7 is a flowchart 700 of a third method for generating questions from source documents. according to disclosed technologies. The rectangular blocks are process blocks of the flowchart. As an aid to illustration, the blocks on the right, with rounded corners, depict data objects associated with the process blocks. The method proceeds from input of a source document to output of questions.

At process block 710, a source document 707 can be received at a computer. At process block 712, text content from the source document 707 can be progressively refined, with various phases (stages) indicated. Through the selection phases 720, 750 and transformation phases 730, 760 of process block 712, questions 761 can be obtained and outputted.

Source document 707 can be received on a tangible medium, such as a flash memory card or an optical disc, or by network transmission from a remote device having tangible storage.

Source document 707 is illustrated as two objects one behind the other, to make clear that either one or more than one source documents 707 could be received. Generally in this disclosure, a description of a singular item can be understood to include two or more of the item within its scope, unless the context makes clear otherwise. Likewise, a description of a plural item can be understood to encompass a single one of that item, unless the context makes clear otherwise. Source document 707 can be a machine-readable facsimile of a written or printed text document, such as an electronic copy of a journal article, a textbook, a training manual, other publication, or other proprietary document. Because optical character recognition (OCR) is an established technology, electronic image and electronic text forms of source document 707 are regarded as equivalent herein. Furthermore, various public and proprietary encodings of electronic text are known, such as used by general purpose office software programs or by lossless compression programs, or through encoding for error correction or encryption. Any or all of these forms are included within the scope of source document 707.

Process block 712 progressively refines the text content of source document 707, in phases. Generally, portions or fragments of text can be selected during a selection phase, and the selected portions or fragments can be transformed during a transformation phase. Selection can guide transformation, and transformation can guide selection. Each phase, except possibly the first executed phase, can read from an intermediate data structure 745, which can store auxiliary data and/or results or output from a previously executed phase. Each phase, except possibly the last executed phase, can write to the intermediate data structure 745. Data structures 745, and other data described herein, can be hosted on any form of computer memory or storage, which can be local to a computer on which a disclosed method executes, remote from the computer, or even cloud resident.

Process block 720 is a first selection phase. For example, content of source document 707 can be analyzed, and portions selected having relevant content. Thus, in a research paper, a sentence such as "A neural network is used to build a language model" could be retained, while a sentence "This work was supported by a grant from the XYZ Foundation" might be removed, because key words such as "work", "supported", and "grant" can be found to be more than a threshold semantic distance away from the subject topic, as measured in a vector space description or other ontological model. As another example, non-processable portions of the source document can be discarded or deselected; such non-processable portions can include embedded images or mathematical equations. In the same example paper, a graph of results could be discarded.

Process block 730 is a first transformation phase. For example, coreferences can be detected, analyzed, and resolved. As other examples, complex sentences can be simplified and spelling mistakes can be corrected. A second version of the selected portions, or of the source document, can be output by this phase.

Process block 750 is a second selection phase. For example, preprocessed text from earlier phases can be matched against a pattern library to select matched fragments of text. As other examples, non-local semantic content and emphasis attributes in the text can be identified and selected during this phase.

Process block 760 is a second transformation phase. Previously identified fragments can be transformed into questions. In examples, this transformation can be dependent on the pattern which matched a given fragment. The generated questions 761 can be outputted to a computer-readable storage medium. In some examples, such a transformation can be performed by a neural network (e.g. mapping a text sequence of the fragment to a text sequence of the question, or simply "seq-to-seq"), while in other examples the transformation can be effected using procedural or functional software code, along with libraries of transformation templates organized according to pattern.

With this disclosure in hand, one of ordinary skill will appreciate that many variations are possible. For example, the above phases can be conveniently described as occurring sequentially, at least for the sake of conceptual understanding, yet this is not a requirement. In some examples, streaming or pipelined processing means that a later stage can commence before a prior stage has finished, even to the point where some questions 761 from page 1 of a document can be outputted before the last page of the document has been received at process block 710. In other examples, phases can be iterated, either individually or in groups or merely for selected portions of text, as described further herein. In further examples, the phases can be reordered, while obtaining similar or equivalent results, albeit with some possible variation in effectiveness.

Moreover, additional phases can be introduced, or phases can be split or coalesced, according to varying embodiments. In examples, separate phases can be introduced for some of the auxiliary tasks listed above for process blocks 720, 730, 750, 760. In examples, phases can be introduced or selected for reiteration dynamically, depending on evaluated properties of the source document or on results obtained during the refinement process.

Additional phases can also be introduced after an initial question generation. For example, generated questions can be evaluated and ranked in one or more dimensions, the initially generated questions can be grouped or selected according to the ranking, and one or more questions or groups can be further transformed, e.g. to incorporate more contextual material associated with a text fragment from which the question was formed.

Dotted line arrows illustrate some flow variations of the method. In some examples, first transformation 730 can be performed iteratively. In other examples, if questions generated by a second transformation phase 760 are evaluated and found suspect, the method can return to first transformation phase 730 to re-evaluate some text simplification or coreference resolution. In further examples, fragments selected at second selection phase 750 can undergo one or more cycles of additional transformation phase 784 and selection phase 750. For example, an additional transformation phase 784 can resolve remaining coreferences or perform text simplification, the latter including reorganizing sentences, splitting sentences, adopting standard forms for words or phrases, handling dashes or other punctuation, or expanding acronyms. FIGS. 3E and 3F provide further illustration of an additional transformation phase 784 and an additional selection phase 750. These flow paths are illustrative; other flows are possible.

Post-question phases can also be implemented to generate answers and distractors (internal or external) as described further herein.

Example Data Evolution

Figure 8:
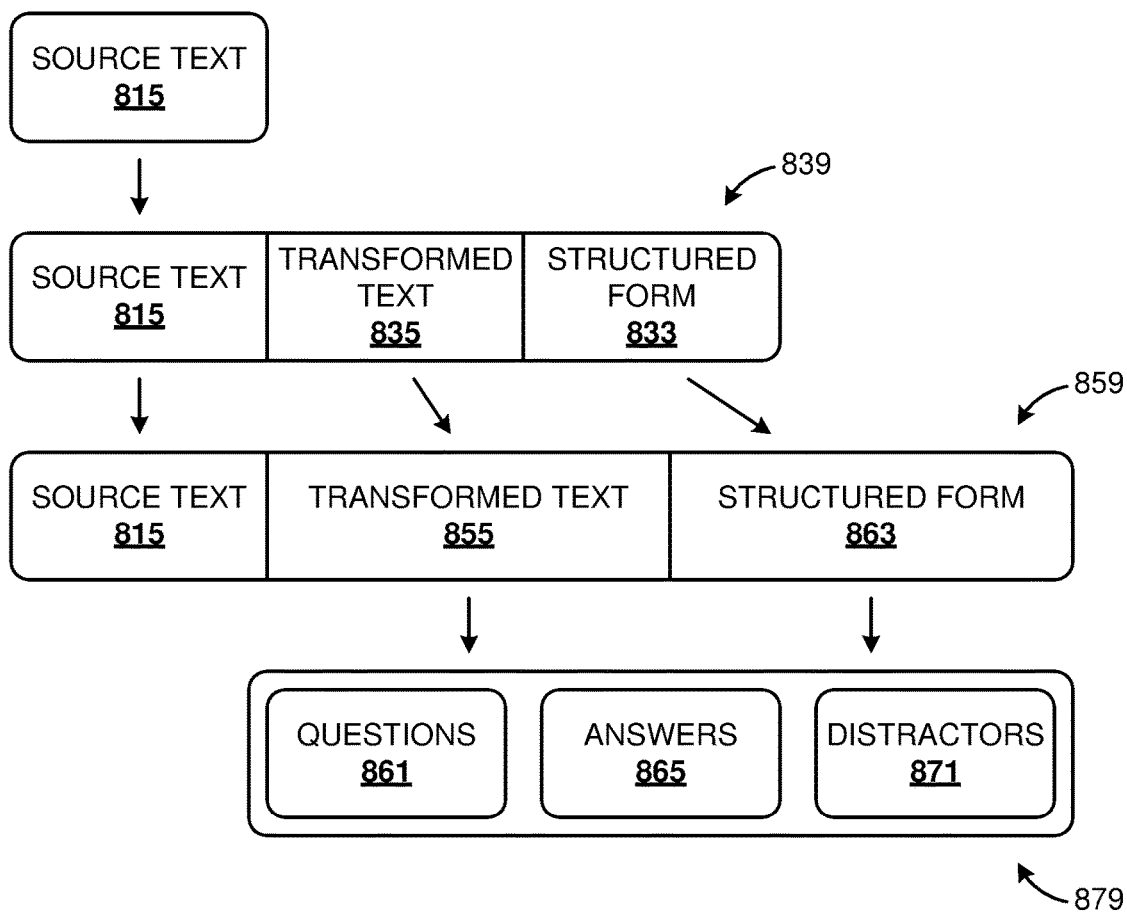
FIG. 8 illustrates the evolution of data over the course of some examples of the disclosed technologies.

FIG. 8 illustrates the evolution of data over the course of some disclosed examples. Initially, source text 815 can be received and stored. Following a first selection phase and a first transformation phase, transformed text 835 and one or more structured counterparts 833 can be obtained. The transformed text 835 can be unstructured text and can comprise a plurality of portions. The structures 833 can comprise multiple separate data structures. Over the duration of one or more phases of text refinement and question, answer, or distractor generation, the components of transformed text 835 and the components of structured text 833 can be maintained and managed together as a package 839, through the use of links, indexes, or other forms of data organization.

Following further refinement, the transformed text 835 and the structured text 833 can both evolve to 855 and 863 respectively, in package 859. As shown, both transformed text 835 and structured text 833 grow over the course of the method, which can be common, especially in examples where multiple versions of text can be kept to facilitate reaching back or retracing process blocks. In other examples, however, one or both of transformed text 835 or structured text 832 can shrink, especially due to selection processes.

As outputs, data package 879 can include questions 861, (correct) answers 865, and optionally distractors 871.

Any of data packages 839, 859, 879 can include additional constituents or metadata not shown. For example, output package 879 can include one or more of rankings, Bloom's taxonomy classifications, or other quality metrics for the questions, answers, and/or distractors.

A Fourth Example Method

Figure 9:
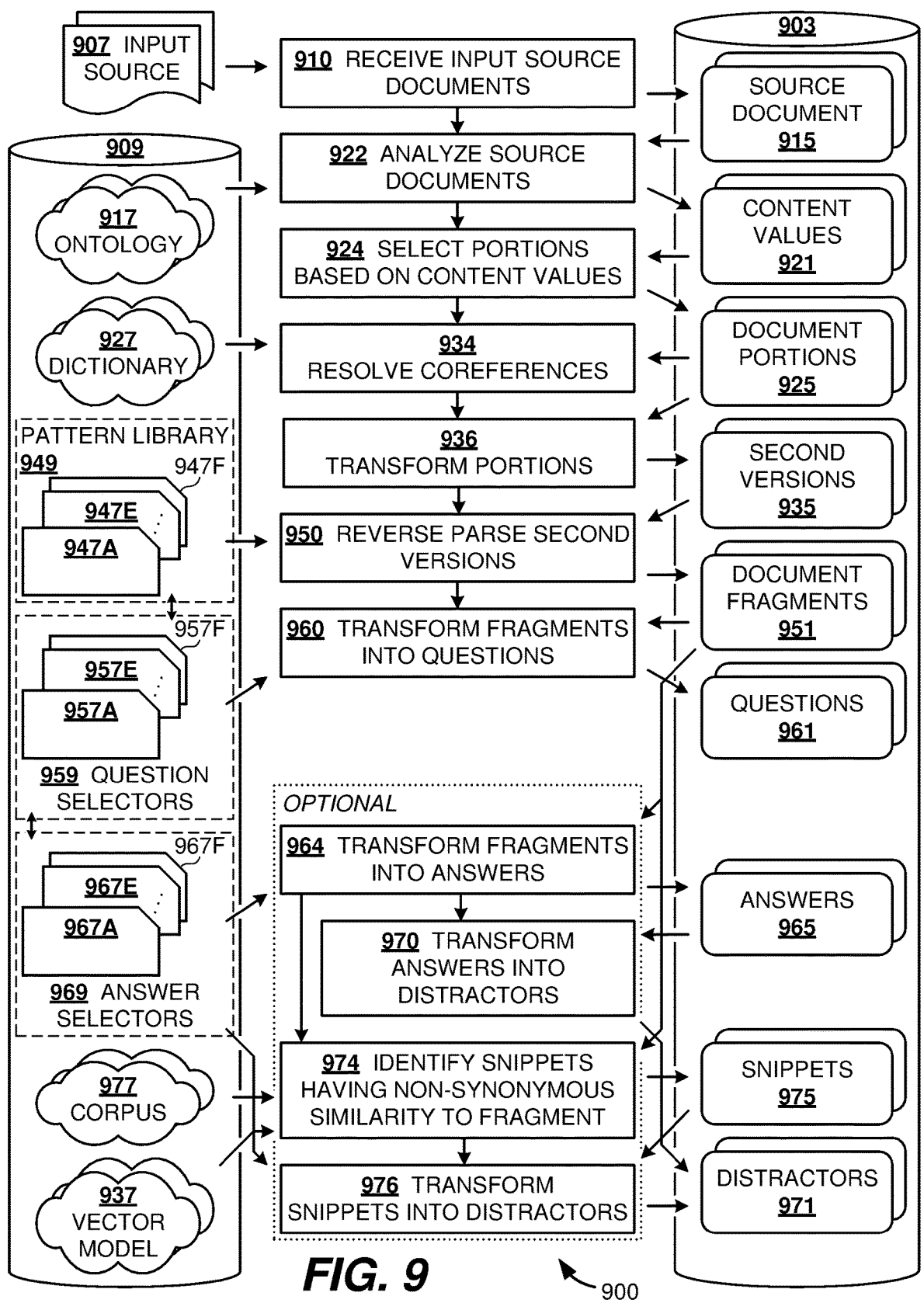
FIG. 9 is a flowchart of a fourth method for question generation according to disclosed technologies.

FIG. 9 is a flowchart 900 of a fourth method for question generation according to disclosed technologies. The method flows from receipt of source text at process block 910 to question generation at process block 960. Data related to source text content can be stored on and retrieved from storage device 903, while other resources can be accessed from storage device 909. In some examples, the method can be augmented with one or more of optional process blocks 964, 970, 974, or 976.

At process block 910, text can be received from one or more input sources 907 and stored as one or more source documents 915, which can be unstructured text, commonly a machine-readable facsimile of written or printed English language text. Although a plurality of source documents 915 are illustrated, the method is operable on a single source document. Where multiple source documents are depicted, the method can operate in parallel, performing one process block on all documents before proceeding to the next process block, or sequentially, performing multiple process blocks on one document before proceeding to the next document, or in batches. A similar range of sequential, parallel, or batch handling can be implemented for the other data objects used or created by the method, and can be chosen independently for each type of data object or for each process block.

At process block 922, source documents 915 can be analyzed and content values 921 can be determined for respective portions of the source documents. At process block 924, portions 925 of the source documents can be selected and retained based on a criterion of having content values 921 above a threshold that can be predetermined, or that can be determined dynamically based on considerations such as a number of questions sought or the distribution of measured content values. Source document analysis 922 can draw upon domain knowledge captured in an ontology 917 or dictionary 927.

At process block 934, document portions 925 can be analyzed to resolve coreferences, and at process block 936 the document portions 925 can be transformed, with resolved coreferences, into second versions 935 of the portions 925. Second versions 935 can also be "portions", as used in this disclosure. The coreference resolution 934 can utilize semantic knowledge resources, such as ontology 917. In "Bob took his dog to the park, where he barked at passersby", the ontology can be used to determine that barking is more closely associated with the dog than with Bob (who can previously have been identified as a male person), indicating that the dog is the most probable resolution of "he". Conversely, if the sentence stated " . . . where he smiled at passersby", semantic analysis can be used to determine that smiling is more closely associated with Bob than with the dog, indicating that "Bob" is the most probable resolution of "he". Thus, an ontological word association can be used to discriminate between alternative resolutions of coreferences.

At process block 950, the second version portions 935 can be reverse parsed by matching against patterns 947A-F from pattern library 949. Matching text fragments 951 can be stored, commonly with an indication of which pattern or patterns 947 match a given fragment 951. At process block 960, question selectors 957 can be obtained from question selector library 959. The retrieved question selectors 957 can be pattern-specific, i.e. known to fit the pattern 947 matching a given fragment 951. One or more retrieved question selectors 957 can be applied to each document fragment 951 to select a snippet of the fragment 951 from which a question 961 can be generated and stored. The choice of a question selector 957 from among multiple question selectors available for a given pattern 947 can be guided by semantic knowledge derived and retained throughout the method as described herein. This semantic knowledge can be part of e.g. structured text 833, 863 or can be part of the pattern 947.

Optional process block 964 transforms fragments 951 into answers 965 in a manner similar to process block 960. For each question 961 (generated through use of a question selector 957), an answer selector 967 complementary to the question selector 957 can be retrieved from an answer selector library 969. The retrieved answer selector 967 can be applied to the instant fragment 951 to select a snippet of the fragment 951 from which an answer 965 can be generated and stored. Bidirectional arrows joining pattern library 949, question selector library 959, and answer selector library 969 indicate the associations between individual answer selectors, question selectors, and patterns.

Different procedures are available for distractor generation, where needed. At optional process block 970, answers 965 can be retrieved from storage and transformed into distractors 971 by one or more techniques such as negation, shifting, or pattern-specific operations as described elsewhere herein. Alternatively or additionally, external distractors can be generated using external corpora 977, ontologies 917, or vector space descriptions 937 of an instant domain. At process block 974, snippets from external resources can be identified having a non-synonymous similarity to the answer 965 or to the fragment 951 from which the answer 965 was generated. At process block 976 the snippets can be transformed into distractors 971 and stored. Optionally, the same answer selector 967 can be used that was used to generate answer 965.

One or more unstructured versions of source text and portions or fragments of text can be generated, stored, retrieved, or maintained by the process blocks 910-976 described above. Additionally or alternatively, one or more parsed or symbolic representations of source content, i.e. structured text, can also be generated, stored, updated, retrieved, or maintained at these process blocks. Structured text can be maintained in one or more data structures, which can be initialized and then read or written to by one or more of process blocks 922, 924, 934, 936, 950, 960, 964, 970, 974, or 976. Data structures such as trees, tables, or graph data structures can be configured to maintain the parsed or symbolic representations of content of source documents.

With this disclosure in hand, one of ordinary skill will appreciate that many variations of this method are possible, beyond those described above.

A First Example Data Flow

Figure 10:
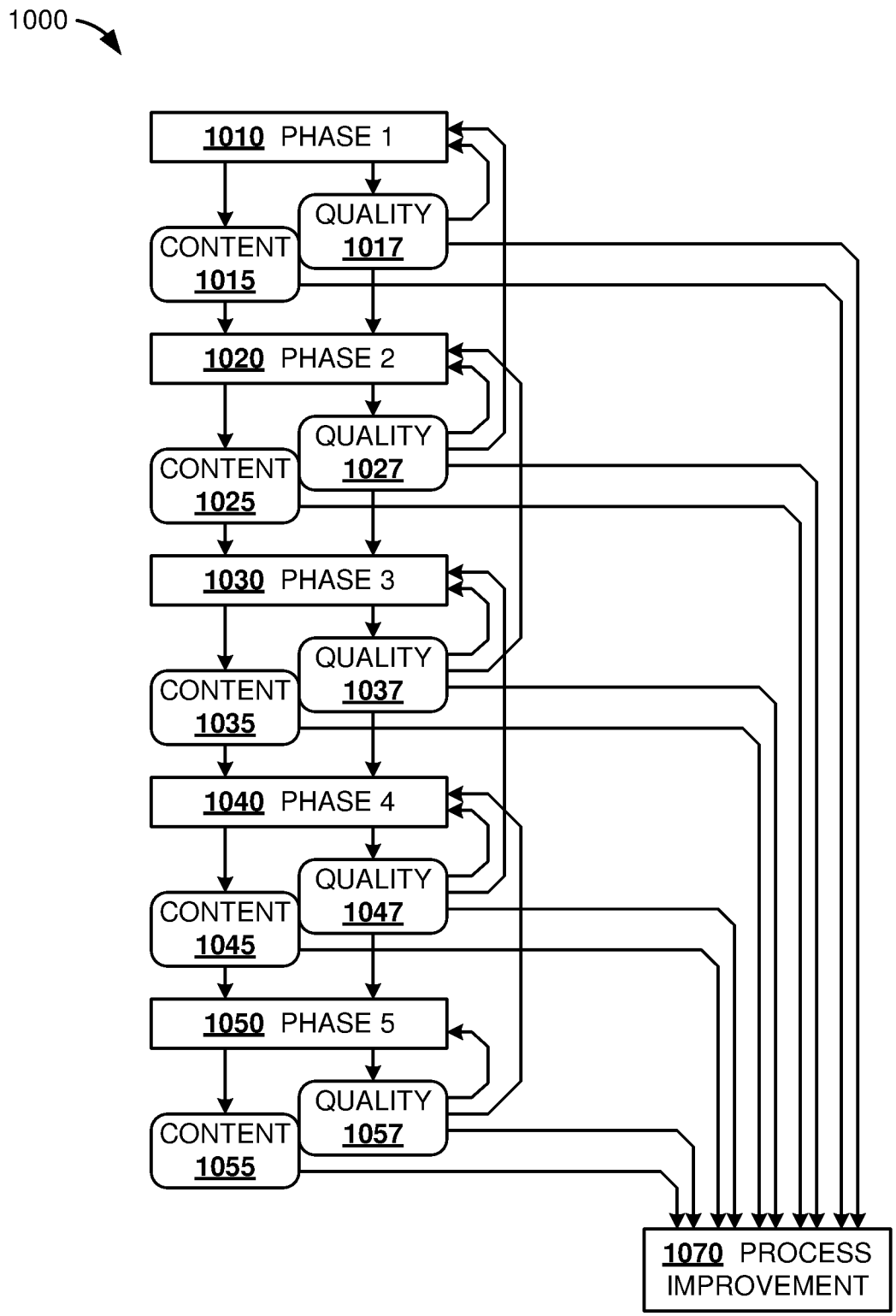
FIG. 10 is a data flow diagram illustrating interactions between phases of some examples of the disclosed technologies.

FIG. 10 can be a data flow diagram 1000 illustrating interactions between phases of some examples of the disclosed technologies. Process blocks are shown as rectangles, while data objects are shown with rounded corners.

Methods described in this disclosure are based on a sequence of phases. Good quality questions, answers, and distractors can be generated from fragments having known combined semantic-syntactic patterns and having sufficiently detailed semantic content. However, starting from original unstructured input text in a source document, only a small proportion of the original text will be in a suitable form to match one of the combined semantic-syntactic patterns. Sentences may be too complex, coreferences may be unresolved, or domain-relevant content may be absent. Furthermore, the combined semantic-syntactic pattern may rely on non-local semantic features that are not known a priori from the original text, but can only be determined from semantic contextual analysis. As such, the sequence of phases described herein progressively improve the detailed semantic content of an increasing proportion of text, such that fragments are obtained, 100% of which match one or another of the combined semantic-syntactic patterns, and from which questions and answers can readily be generated. Particularly, a given pair of adjacent selection and transformation phases can improve the detailed semantic content of given portion(s) of text, can increase the proportion of source text having detailed semantic content, or can both improve semantic content and increase the proportion of text having detailed semantic content. In some examples, improvement of semantic content means that a pattern of higher degree can be matched to a given portion of text, while in other examples, improvement of semantic content means that the matching score of a given pattern to a given portion of text is improved.

Natural language processing can be prone to challenges and uncertainties due to the richly varying nature of input source documents. As such, certain operations of the described methods could involve probabilistic determinations, and yield output of varying quality (e.g. certain, likely, or best guess). As a feature to improve the overall results, quality assessments can be associated with and can, in examples, be carried along with outputted data.

In FIG. 10, a succession of phases 1-5 is depicted as process blocks 1010, 1020, 1030, 1040, 1050. Each of these process blocks produces respective content 1015, 1025, 1035, 1045, 1055. The content can comprise any of the forms of textual data described herein such as: unstructured text, structured text, parse trees, semantic attributes, portions, fragments, snippets, questions, answers, or distractors. Associated with these content outputs 1015-1055 are corresponding quality outputs 1017, 1027, 1037, 1047, 1057. Each quality output can be associated with one or more respective content objects, or can be associated with a preceding process rather than with a particular content object.

As shown in FIG. 10, content object 1015 and quality object 1017 can be output from Phase 1 1010 and forwarded to the next Phase 2 1020, and similarly for the other content objects 1025-1055 and other quality objects 1027-1057. Besides being used in succeeding phases, quality objects can also be used to re-spin a phase that has already been executed. For example, quality object 1017 can be fed back to Phase 1 1010 to try again. Similarly, other quality objects 1027-1057 can be fed back to their respective phases to improve output quality. Moreover, situations can arise where a problem in the quality achieved at a phase stems from earlier phases. As illustrated in FIG. 10, quality indicators 1027, 1047, from Phase 2 1020 and Phase 4 1040 respectively, can be fed back to Phase 1 1010 or Phase 3 1030 as needed. In examples, an upstream selection or transformation phase can be repeated, based at least partly on a quality indicator determined at a downstream selection or transformation phase. Iteration of one or more phases to obtain improved quality at one or more checkpoints of the question generation method has been found to significantly improve the quality or coverage of generated questions, answers, or distractors. Similar paths are also shown for quality indicators 1037, 1057. In varying implementations, some one or more of these feedback paths can be more or less important; some could be omitted. In some examples, further feedback paths could also exist, e.g. feeding back quality object 1057 to Phase 1 1010. Furthermore, while feedback can be primarily dependent on quality, the actual re-visit to an earlier phase can require carrying along the output content as well. For example, if a problem with quality 1047 causes the method to return to Phase 3 1030, it can be desirable for Phase 3 1030 to have access to some or all of content 1045 so as to see and attempt to correct some problem arising due to an action at Phase 3 1030. For simplicity of illustration, these feedback paths for content objects are not shown in FIG. 10.

Furthermore, quality improvement is not limited to a current question generation task. Various content objects 1015-1055 and various quality objects 1017-1057 can be stored for later use or forwarded for use at process block 1070 for process improvement, as shown. Lack of coverage, poor quality questions, answers, or distractors can all be evaluated to detect and remedy problems. Examples of such problems can include lack of patterns for a particular writing style, inadequate discrimination of different meanings of a particular word, inability to recognize colloquialisms, inability to overcome grammatical errors in the source document, or inability to attach the right non-local semantic content to fragments in order to obtain a pattern match. As an illustration, source text passages can be identified for which satisfactory questions, answers, or distractors have not been generated, and one or more phases can be modified in response. For example, a coreference resolution process can be adapted, new patterns or sub-cases can be developed, or an ontology can be revised.

A Second Example Data Flow

Figure 11:
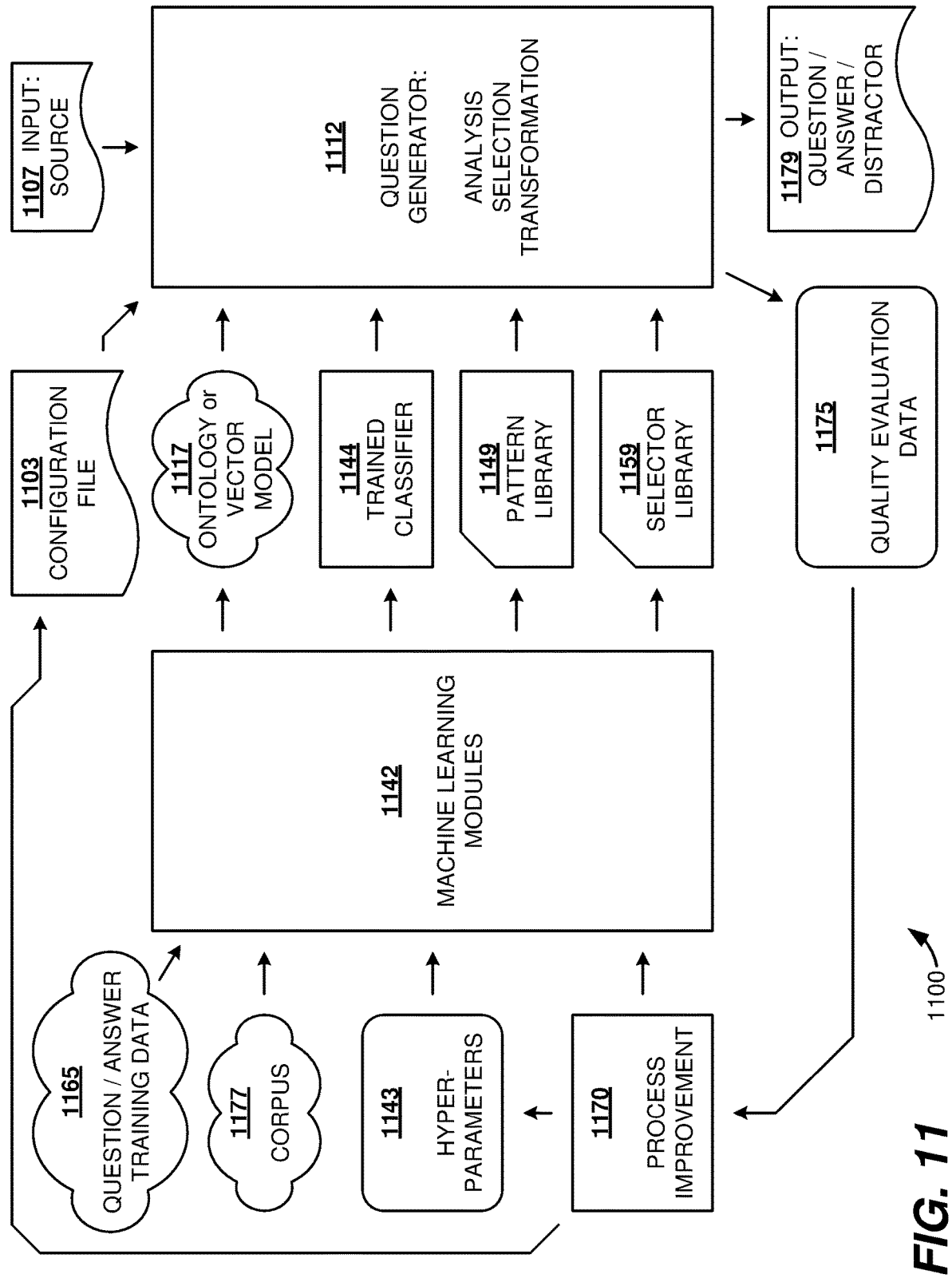
FIG. 11 is a system-level data flow diagram for some examples of the disclosed technologies.

FIG. 11 is a system-level data flow diagram 1100 for some examples of the disclosed technologies. Methods described in this disclosure are operable to receive an input source document 1107 and generate some or all of questions, answers, or distractors as output 1179. The substance of these methods is represented by process block 1112.

The disclosed methods operate as part of a computation and data ecosystem which is reflected by the other entities of FIG. 7. Particularly, the described methods make use of resources such as domain knowledge descriptions 1117, which can be in the form of an ontology or vector model, and libraries 1149, 1159 of patterns and question or answer selectors. Any or all of the domain knowledge descriptions 1117, a pattern library 1149, or a selector library 1159 are resources that can be generated by respective machine learning methods, represented by machine learning modules 1142 in FIG. 11. The generation and choice of particular resources can be dependent on the knowledge domain and text language for a particular question generation project, and can further depend on the type of questions desired. For example, different pattern or selector libraries can be used for multi-sentence fragments and single-sentence fragments. Different libraries can also be used depending on the level of questions sought (according to Bloom's taxonomy).

In examples, the above-mentioned resources can be developed by training a machine learning module. For example, a domain knowledge description 1117 can be obtained by training a shallow neural network at 1142 with a corpus 1177 of domain data. Pattern and selector libraries 1149, 1159 can be built by training a shallow neural network at 1142 with question/answer training data 1165. While shallow neural networks have been demonstrated to provide suitable results, other machine learning models can be used. Trained classifiers 1144 can be used in certain roles, for example to perform a fragment-to-question transformation. Deep neural networks can be advantageous for question generation at higher levels of Bloom's taxonomy.

In some examples, the pattern libraries 1149 can be output directly by a machine learning module at 1142, while in other examples the output patterns can be ported to code (e.g. code of a functional language) to be applied or executed at runtime of method 1112, for pattern matching. Similarly, question or answer selector libraries 1150 can be used directly as obtained from a machine learning module at 1142, or can be ported to code for use in a method 1112.

In examples, the machine learning procedures 1142 can be done once, for one or more knowledge domains, and the resulting resources can be reused for multiple question generation projects. That is, to the extent that building of resources does not rely on any particular input source 1107, the resources can be built ahead of time, even before receipt of input source 1107, and before runtime execution of a method 1112. As a practical matter, however, the knowledge domain or target question requirements for a new project can differ sufficiently from previous projects that new resources (domain representation 1117, libraries 1149, 1159) can be required before method 1112 can be executed. Thus, a higher level method could include operations to build resources, as described herein, followed by operations 1112 to generate questions utilizing these resources.

Moreover, the method 1112 can generate quality information 1175 along with content output 1179, and this quality information 1175 can be provided to process block 1170 for process improvement. Through process improvement 1170, improvements can be made to the machine learning operations, either by setting or adjusting one or more hyperparameters 1143, or directly making an adjustment to one or more machine learning modules 1142. Thus, quality feedback can be used to improve the resources used by method 1112 and thereby obtain questions, answers, or distractors 1179 of better quality. Process improvement 1170 can also be used to implement modifications to configuration file 1103. Example methods can include using quality indicators 1175 output by one or more selection or transformation phases of method 1112 to update an ML module 1142, or to update hyperparameters 1143, or to update configuration file 1103.

Configuration file 1103 can contain job-specific configuration requirements for a question generation method 1112. A wide range of controls can be provided in configuration file 1103, including (a) output requirements such as type of questions, number of questions, or whether the application is for a question bank or a single assessment, or (b) flow control for the method 1112, such as number of iterations to perform for coreference resolution, flags to select which checks and corrections should be implemented, the extent to which non-local text should be explored to refine semantic content of a given fragment, or an ordering of phases to be performed. Job requirements for question generation can include target requirements for coverage of the source material, or targeted levels of Bloom's taxonomy at which questions can be generated. An auxiliary help file (not shown) can also be provided to guide semantic analysis specific to a particular job.

The process improvement described in context of FIGS. 10-11 can be applied in different ways. In a first way, quality improvement can be applied to a current job, which can be repeated with progressively improved resources until a target quality has been met. In a second way, the quality improvement can be used to improve the question generation process between jobs, so that quality feedback from a first job takes effect when a second job is run. In a third way, process improvement can be performed offline using dummy source input 1107, and making adjustments between multiple trials of method 1112 on the same dummy source input 1107.

Additional Exemplary Features

Other Natural Language Processing Applications

While the focus of this disclosure is on question generation, the progressive refinement approach disclosed is quite powerful. Similar approaches can be applied to other problems in natural language processing. Data structures similar to 859, combining refined text and deep semantic-syntactic analysis, can be generated, stored, and used for other purposes. Potential applications include topic generation, topic labeling, digest generation, or text evaluation, each of which in turn has many different uses.

Probabilistic Matching and Parsing

The matching can be an aggregate of multiple probabilistic calculations. The code can be visualized as a recursive tree structure where, at multiple steps, a decision can be made based on probabilistic data. An example of this is determining whether or not a given word or expression in the input text meets the criteria for a semantic sub-constraint in a given pattern. For example, what is the probability that a verb, given a context in a sentence or document, represents an action involving physical motion? The answer to this question will be a probability from one or more ML models, based on all the examples of this verb being used in a very large document corpus that was used to train the model. The cutoff in each model can be set differently, and the results of those decisions can be aggregated. If a decision is ambiguous, both branches of the decision tree may be maintained for a limited number of operations. The question of whether or not the overall pattern is matched depends on a composite of the probabilities determined at each of multiple nodes of the recursive tree (which are decision points). As a further feature, blended decision-making techniques can be used, using a combination of probabilistic data from ML models and data from ontologies (e.g. WordNet). In such examples, the ML and non-ML data can be weighted to derive a composite or final decision. Multiple syntactic parsing methods can be used in parallel to determine if there are multiple possible higher probability parses of a given text input. A given parse can be denoted "high probability" if its probability is within a cutoff factor of the most probable parse. In examples, the cutoff factor can range from 1.5 to 10, for example 2. If the models do not converge on a single parse pattern, then semantic or other data can be used to distinguish between the high probability parses.

Differences from Human Approach

While one of the objectives of the disclosed technologies is to generate output (e.g. questions, answers, or distractors) that can be difficult to distinguish from output a person might produce, the present approach is completely different from how a human would tackle the same tasks. Particularly, a person would not adopt an iterative select/transform approach. A person would not resolve coreferences iteratively according to coreference type, nor would a person maintain multiple alternatives to be resolved later. A person would not reverse parse text by successively matching patterns from a pattern library. A person would not apply pattern-specific selectors to a text fragment to extract snippets for question or answer formation. A person would not take an initial answer and add decorators or descriptors to arrive at a minimum viable answer. A person would not evaluate semantic distances of text passages from a correct answer in order to identify a passage with non-synonymous similarity. Various embodiments of the disclosed technology do all of these actions.

A Generalized Computer Environment

Figure 12:
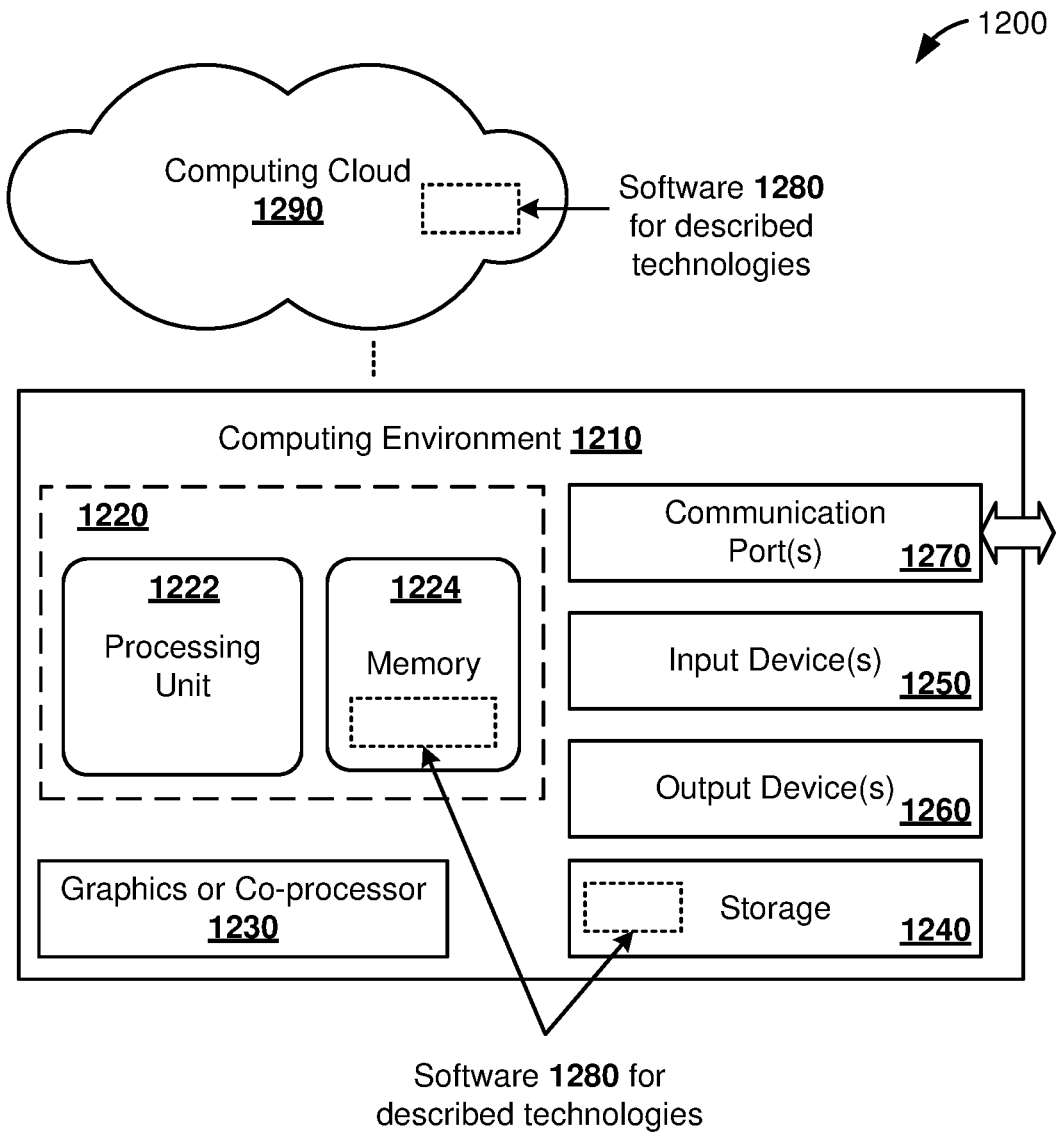
FIG. 12 is a diagram schematically depicting a computing environment suitable for implementation of disclosed technologies.

FIG. 12 illustrates a generalized example of a suitable computing system 1200 in which described examples, techniques, and technologies, including construction, deployment, operation, refinement, and maintenance of a question generation tool, can be implemented. The computing system 1200 is not intended to suggest any limitation as to scope of use or functionality of the present disclosure, as the innovations can be implemented in diverse general-purpose or special-purpose computing systems.

With reference to FIG. 12, computing environment 1210 includes one or more processing units 1222 and memory 1224. In FIG. 12, this basic configuration 1220 is included within a dashed line. Processing unit 1222 executes computer-executable instructions, such as for implementing components of a question generation tool (e.g., components shown in FIG. 11), any of the methods described herein (e.g., illustrated in context of FIG. 7-2, 1, or 9-10), or various other architectures, components, data structures, handlers, managers, modules, or repositories described herein. Processing unit 1222 can be a general-purpose central processing unit (CPU), a processor in an application-specific integrated circuit (ASIC), or any other type of processor. In a multi-processing system, multiple processing units execute computer-executable instructions to increase processing power. Computing environment 1210 can also include a graphics processing unit or co-processing unit 1230. Tangible memory 1224 can be volatile memory (e.g., registers, cache, or RAM), non-volatile memory (e.g., ROM, EEPROM, or flash memory), or some combination thereof, accessible by processing units 1222, 1230. The memory 1224 stores software 1280 implementing one or more innovations described herein, in the form of computer-executable instructions suitable for execution by the processing unit(s) 1222, 1230.

A computing system 1210 can have additional features, such as one or more of storage 1240 (representing e.g. storage devices and systems shown in FIGS. 1 and 9), input devices 1250, output devices 1260, or communication ports 1270. An interconnection mechanism (not shown) such as a bus, controller, or network interconnects the components of the computing environment 1210. Typically, operating system software (not shown) provides an operating environment for other software executing in the computing environment 1210, and coordinates activities of the components of the computing environment 1210.

The memory 1224 or storage 1240 can also store database data, including structured or unstructured text, such as source documents, portions, versions, fragments, snippets, output questions, answers, or distractors; libraries for patterns, question selectors, or answer selectors; ontologies, dictionaries, vector space descriptions, or distractor databases; corpora, links, quality data, or metadata; ML models; or training data. The memory 1224 or storage 1240 can also store some or all of a configuration file, an auxiliary input file, hyperparameters, and/or other configuration and operational data.

The tangible storage 1240 can be removable or non-removable, and includes magnetic disks, magnetic tapes or cassettes, CD-ROMs, DVDs, or any other medium which can be used to store information in a non-transitory way and which can be accessed within the computing environment 1210. The storage 1240 stores instructions of the software 1280 (including instructions and/or data) implementing one or more innovations described herein.

The input device(s) 1250 can be a mechanical, touch-sensing, or proximity-sensing input device such as a keyboard, mouse, pen, touchscreen, or trackball, a voice input device, a scanning device, or another device that provides input to the computing environment 1210. The output device(s) 1260 can be a display, printer, speaker, optical disk writer, or another device that provides output from the computing environment 1210.

The communication port(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1200 can also include a computing cloud 1290 in which instructions implementing all or a portion of the disclosed technology can be executed. Any combination of memory 1224, storage 1240, and computing cloud 1290 can be used to store software instructions and data of the disclosed technologies. A local or datacenter computing environment 1210 can utilize the computing cloud 1290 to obtain computing services and perform computing operations (e.g., data processing, data storage, and the like).

In some examples, software embodiments of the disclosed technologies can be deployed on a parallel or massively parallel environment, such as a server cluster, a large multiprocessor system, or a supercomputer. Software embodiments can also be implemented on workstations having at least 16 GB of RAM. The RS2 programming language described herein is specifically designed to support the types of massively parallelized NLP and machine learning operations (e.g. stacking of multiple models) required in this type of codebase by incorporating automated multithreading, as a default, combined with a unique system of optimized caching.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

The terms "system", "environment", and "device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in one or another form of physical computer hardware.

General Considerations

As used in this disclosure, the singular forms "a", "an", and "the" include the plural forms unless the context clearly dictates otherwise. Additionally, the terms "includes" and "incorporates" mean "comprises". Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way.

Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "access", "analyze", "apply", "branch", "build", "correct", "create", "cull", "determine", "encode", "evaluate", "execute", "feed", "filter", "find", "forward", "generate", "identify", "iterate", "label", "map", "mark", "move", "negate", "obtain", "output", "parse", "pipeline", "process", "rank", "reach", "receive", "record", "repeat", "replace", "resolve", "retain", "retrieve", "scan", "select", "sense", "shift", "simplify", "split", "standardize", "store", "stream", "strip", "substitute", "transform", and "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smart-phones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1224, and storage 1240. The term computer-readable storage media does not include signals and carrier waves. In addition, the term computer-readable storage media does not include communication ports (e.g., 1270) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Haskell, Java, JavaScript, Julia, Lisp, Matlab, Octave, Perl, Python, R, RS2, Ruby, SAS, SPSS, SQL, WebAssembly, any derivatives thereof, or any other suitable programming language, or, in some examples, markup languages such as HTML or XML, using CSS, JSON, or any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method for generating questions from a source document, comprising:
   selecting passages of text from the source document based on a first criterion;
   transforming the selected text passages based on coreference analysis;

selecting fragments of text in the transformed text passages based on matching combined semantic-syntactic patterns from a pattern library; and automatically generating the questions by transforming the selected text fragments.

2. The method of claim 1, wherein the first criterion is that, to be selected, a given passage of text has a similarity greater than or equal to a content relevance threshold, relative to at least one subject matter descriptor of the source document.

3. The method of claim 1, wherein the transformation of a given selected text passage based on coreference analysis further comprises:

identifying, in the given text passage, coreferences comprising one or more of: anaphora, cataphora, endophora, or exaphora;

classifying the coreferences according to a plurality of coreference types; and for an instant type which is a most easily resolved one of the coreference types:

selecting the coreferences classified as the instant type;

analyzing at least the given text passage to determine most probable resolutions of the selected coreferences; and replacing one or more of the selected coreferences with their most probable resolutions.

4. The method of claim 3, further comprising, subsequent to the replacing:

regenerating the given text passage;

selecting new coreferences classified as a second one of the coreference types which is a most easily resolved type after the instant type;

analyzing at least the given text passage to determine most probable resolutions of the new selected coreferences; and replacing the new selected coreferences with their most probable resolution.

5. The method of claim 3, wherein a sequence of the selecting coreferences, the analyzing, and the replacing is repeated for a plurality of successive instant types of the coreference types.

6. The method of claim 1, wherein at least one of the combined semantic-syntactic patterns in the pattern library comprises a plurality of nodes representing respective syntactic parts of a text fragment, at least one of the nodes having a corresponding semantic attribute, and at least one pair of the nodes connected by a relationship attribute.

7. The method of claim 6, wherein a given one of the combined semantic-syntactic patterns has a degree in the range 10-20 inclusive, wherein the degree comprises a sum of numbers of: nodes, semantic attributes, syntactic attributes, and relationship attributes, over all the nodes of the given combined semantic-syntactic pattern.

8. The method of claim 6, wherein the matching comprises:

comparing the nodes, the corresponding semantic attribute(s), and the relationship attribute(s) of a given one of the combined semantic-syntactic patterns with a given text fragment to determine a matching score; and selecting the given text fragment as matching the given combined semantic-syntactic pattern if the matching score is greater than or equal to a matching threshold.

9. The method of claim 1, wherein the transformation of a given selected text fragment is dependent on a first pattern of the pattern library matched by the given selected text fragment, and results in a first one of the questions.

10. The method of claim 9, further comprising:

selecting a selector based on the first pattern; and applying the selector to the given selected text fragment to determine a correct answer for the first question.

11. The method of claim 10, further comprising generating internal distractors for the first question by performing one or more of:

applying negation to the correct answer;

applying shifting to the correct answer; or applying a pattern-substitution on the correct answer.

12. The method of claim 10, further comprising:

identifying text, in the source document or in an external corpus, having a syntactic match with the correct answer and a non-synonymous semantic similarity between vectors representing the identified text and the correct answer; and transforming the identified text into a distractor.

13. One or more computer-readable media storing instructions which cause the method of claim 1 to be performed, when the instructions are executed by one or more computer processors.

14. A method of generating questions from a source document, comprising:

at one or more computers:

receiving the source document;

progressively refining text of the source document in phases to generate the questions, the phases comprising:

a first selection phase, a first transformation phase at which semantic content of individual sentences is localized, a second selection phase based on matching combined semantic-syntactic patterns from a pattern library, and a second transformation phase at which the questions are generated; and outputting the generated questions;

wherein one or more of the combined semantic-syntactic patterns in the pattern library comprises a plurality of nodes representing respective syntactic parts of a text fragment, at least one of the nodes having a corresponding semantic attribute, and at least one pair of the nodes connected by a relationship attribute; and wherein a given one of the one or more combined semantic-syntactic patterns has a degree of at least 10, wherein the degree comprises a sum of numbers of: nodes, semantic attributes, syntactic attributes, and relationship attributes, over all the nodes of the given combined semantic-syntactic pattern.

15. The method of claim 14, wherein the second selection phase comprises reverse parsing by matching an input to the second selection phase against the pattern library of combined semantic-syntactic patterns.

16. The method of claim 14, wherein at least one of the combined semantic-syntactic patterns spans more than one sentence.

17. The method of claim 14, wherein the first selection phase comprises determining respective content values for portions of the source document, and selecting, based on the content values, a first one of the portions as output of the first selection phase.

18. The method of claim 17, wherein the first selection phase, the first transformation phase, the second selection phase, and the second transformation phase are performed in that order.

19. The method of claim 18, further comprising one or more pairs of an additional selection phase and an additional transformation phase.

20. A computer-implemented method for generating one or more questions, comprising:
   receiving one or more source documents;
   analyzing the source document(s);
      wherein the analyzing comprises determining respective first numerical content value scores for portions of the source document(s);
   first selecting one or more of the portions based upon the respective first numerical content value scores;
   resolving coreferences in the first selected portion(s);
   first transforming the first selected portion(s) into one or more second version documents comprising transformations of the resolved coreferences;
   reverse parsing the second version document(s) using a pattern library to second select one or more fragments of the second version document(s);
   second transforming the second selected fragment(s) into the question(s).

\* \* \* \* \*